United States Patent
Javeed et al.

(10) Patent No.: US 10,829,696 B2
(45) Date of Patent: Nov. 10, 2020

(54) DECHLORINATION OF MIXED PLASTICS PYROLYSIS OILS USING DEVOLATILIZATION EXTRUSION AND CHLORIDE SCAVENGERS

(71) Applicant: SABIC Global Technologies B.V., Bergen op Zoom (NL)

(72) Inventors: Mohammad Javeed, Bangalore (IN); Alexander Stanislaus, Bangalore (IN); Abrar A. Hakeem, Elsloo (NL); Girish Koripelly, Bangalore (IN); Ravichander Narayanaswamy, Bangalore (IN); Krishna Kumar Ramamurthy, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/319,878

(22) PCT Filed: Jul. 17, 2017

(86) PCT No.: PCT/IB2017/054313
§ 371 (c)(1),
(2) Date: Mar. 12, 2019

(87) PCT Pub. No.: WO2018/025103
PCT Pub. Date: Feb. 8, 2018

(65) Prior Publication Data
US 2019/0270939 A1    Sep. 5, 2019

Related U.S. Application Data

(60) Provisional application No. 62/369,379, filed on Aug. 1, 2016.

(51) Int. Cl.
C10G 1/10    (2006.01)
C10G 25/05   (2006.01)
(Continued)

(52) U.S. Cl.
CPC .............. *C10G 1/10* (2013.01); *B29B 17/04* (2013.01); *C10B 53/07* (2013.01); *C10G 1/002* (2013.01);
(Continued)

(58) Field of Classification Search
CPC ...................................................... C10G 1/10
See application file for complete search history.

(56) References Cited

U.S. PATENT DOCUMENTS 4,956,076 A    9/1990  Awbrey ................. 208/291
5,608,136 A *  3/1997  Maezawa .......... C10B 53/07
                                              201/2.5

(Continued)

FOREIGN PATENT DOCUMENTS

DE    933826 C  * 10/1955 ............ C10G 65/10
JP    H0985046 A   3/1997
(Continued)

OTHER PUBLICATIONS

Machine translation of DE933826C, which is dated Oct. 6, 1955. Retrieved Jan. 14, 2020 (Year: 2020).*
(Continued)

*Primary Examiner* — Philip Y Louie
*Assistant Examiner* — Alyssa L Cepluch
(74) *Attorney, Agent, or Firm* — Norton Rose Fulbright US LLP

(57) ABSTRACT

A process for dechlorination of a hydrocarbon stream and/or a hydrocarbon stream precursor comprising introducing the hydrocarbon stream and/or hydrocarbon stream precursor, a first zeolitic catalyst, and a stripping gas to a devolatilization extruder (DE) to produce an extruder effluent, wherein the hydrocarbon stream and/or hydrocarbon stream precursor comprises one or more chloride compounds in an amount of equal to or greater than about 10 ppm chloride, based on the
(Continued)

total weight of the hydrocarbon stream and/or hydrocarbon stream precursor, and wherein the extruder effluent comprises one or more chloride compounds in an amount of less than the chloride amount in the hydrocarbon stream and/or hydrocarbon stream precursor.

9 Claims, 10 Drawing Sheets

(51) Int. Cl.
| | |
|---|---|
| C10G 1/00 | (2006.01) |
| C10G 55/04 | (2006.01) |
| C10G 55/06 | (2006.01) |
| B29B 17/04 | (2006.01) |
| C10G 1/08 | (2006.01) |
| C10B 53/07 | (2006.01) |
| C10G 11/18 | (2006.01) |
| C10G 55/02 | (2006.01) |
| C10K 1/32 | (2006.01) |
| C10K 1/00 | (2006.01) |
| B29K 27/00 | (2006.01) |

(52) U.S. Cl.
CPC .............. *C10G 1/086* (2013.01); *C10G 11/18* (2013.01); *C10G 25/05* (2013.01); *C10G 55/02* (2013.01); *C10G 55/04* (2013.01); *C10G 55/06* (2013.01); *C10K 1/003* (2013.01); *C10K 1/32* (2013.01); *B29B 2017/0496* (2013.01); *B29K 2027/00* (2013.01); *C10G 2300/1003* (2013.01); *C10G 2300/202* (2013.01); *Y02P 20/143* (2015.11)

(56) References Cited

U.S. PATENT DOCUMENTS

| | | | |
|---|---|---|---|
| 5,783,068 A | 7/1998 | Laborde et al. | 208/262.1 |
| 5,849,964 A * | 12/1998 | Holighaus | C10G 1/10 585/241 |
| 6,011,187 A | 1/2000 | Horizoe et al. | 585/241 |
| 9,212,318 B2 | 12/2015 | Narayanaswamy et al. | 585/648 |
| 10,442,997 B2 * | 10/2019 | Narayanaswamy | C10G 1/10 |
| 10,513,661 B2 * | 12/2019 | Narayanaswamy | C10G 1/06 |
| 2008/0099323 A1 * | 5/2008 | Kitamura | B09B 3/00 201/21 |
| 2010/0274066 A1 * | 10/2010 | Upson | B01J 29/80 585/653 |
| 2011/0166397 A1 | 7/2011 | Fujimoto et al. | 585/241 |
| 2012/0165583 A1 * | 6/2012 | Garforth | B01J 29/084 585/241 |
| 2012/0215043 A1 * | 8/2012 | Gaffney | B01J 29/064 585/241 |
| 2014/0228606 A1 * | 8/2014 | Narayanaswamy | C10G 1/10 585/241 |
| 2015/0053589 A1 | 2/2015 | Vilasrao Dalal et al. | 208/262.1 |
| 2016/0024390 A1 | 1/2016 | Ullom | 201/25 |

FOREIGN PATENT DOCUMENTS

| | | |
|---|---|---|
| JP | 2000044726 A | 2/2000 |
| JP | 3297322 B2 | 7/2002 |
| JP | 04038892 B2 | 1/2008 |

OTHER PUBLICATIONS

International Search Report and Written Opinion for PCT/IB2017/054313, dated Oct. 17, 2017, 10 pages.

* cited by examiner

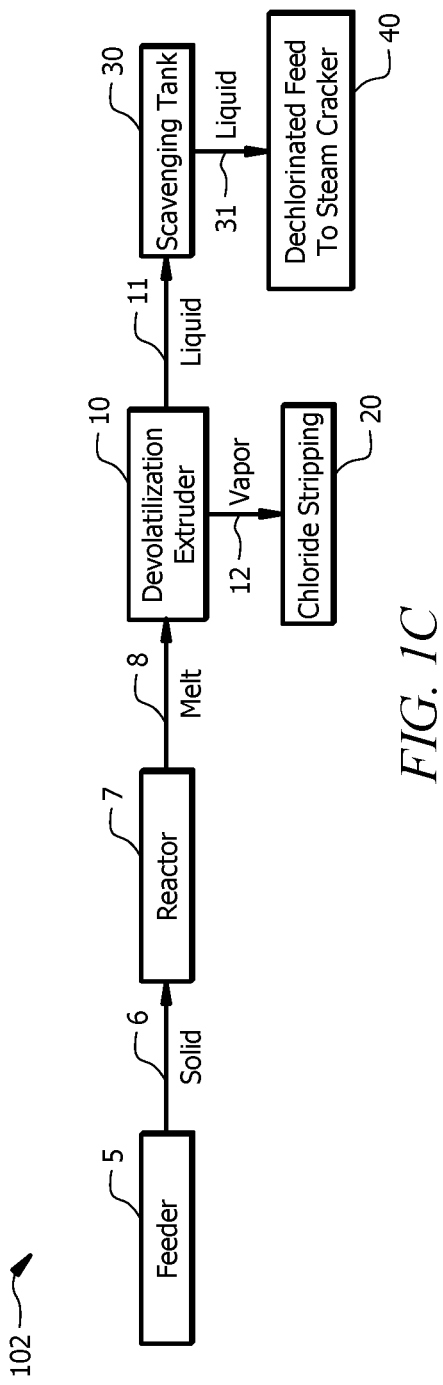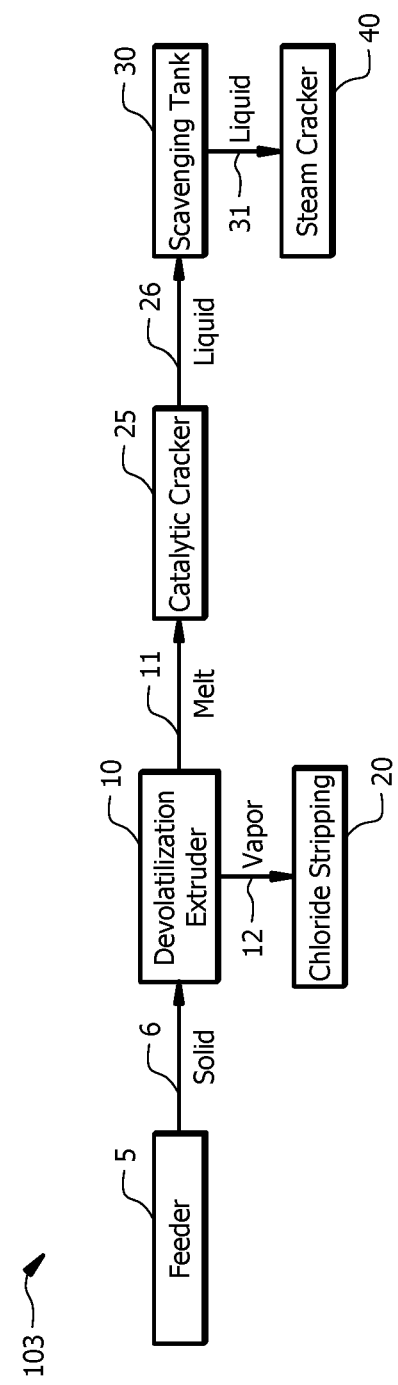
FIG. 1C
FIG. 1D

Table 1: Plastic Model Feed Composition

| Feed Component | With PET (wt. %) | Without PET (wt. %) |
|---|---|---|
| LLDPE | 18 | 19 |
| LDPE | 20 | 22 |
| HDPE | 19 | 20 |
| PP | 23 | 25 |
| PET | 7 | |
| PS | 11 | 12 |
| PVC | 2 | 2 |
| TOTAL MIXTURE (g) | 100 | 100 |

*FIG. 5A*

Table 2: RBF Run Conditions

| | RBF RUN #1 | RBF RUN #2 | RBF RUN #3 | RBF RUN #4 | RBF RUN #5 | RBF RUN #6 | RBF RUN #7 |
|---|---|---|---|---|---|---|---|
| Feed (g) | 100 | 100 | 100 | 100 | 100 | 100 | 100 |
| ZSM-5 CAT-1 (g) | 5 | | | | | 4 | 4 |
| 10% Mg Loaded ZSM-5 CAT-1 (g) | | 5 | 5 | 5 | 5 | 1 | 1 |
| Cracking Temperature (°C) | 360 | 360 | 300 | 330 | 340 | 360 | 360 |
| Hold Time (min) | 20 | 20 | 20 | 20 | 20 | 20 | 20 |
| PET | Yes | Yes | Yes | Yes | No | Yes | Yes |
| $N_2$ Purge | Constant | Constant | Constant | Constant | Constant | Constant | Constant |
| Mass Closure (%) | 94.52 | 92.63 | 97.32 | 95.48 | 89.82 | 89.23 | 90.09 |
| Volatiles (%) | 5.48 | 7.37 | 2.68 | 4.52 | 10.18 | 10.77 | 9.91 |

Note: RBF run #7 was conducted by reheating the product from RBF run #4 to mimic a low severity cracking in a downstream cracking unit.

*FIG. 5B*

Table 3: Total Chloride Analysis of RBF Runs 1 to 4

| Sample | Catalyst | Quantity of catalyst with respect to the feed | Temperature (°C) | ppm Chloride Measurement number | | Wash recovered | ppm Chloride Measurement number | |
|---|---|---|---|---|---|---|---|---|
| | | | | #1 | #2 | | #1 | #2 |
| RBF Run #1 | ZSM-5 CAT-1 | 5% | 360 | 1 | 1 | RBFW1a | 24 | 23 |
| | | | | | | RBFW1b | 5 | 4 |
| | | | | | | RBFW1c | 6 | 6 |
| RBF Run #2 | Mg-ZSM-5 CAT-1 | 5% | 360 | 1 | 1 | RBFW2a | 80 | 109 |
| | | | | | | RBFW2b | 29 | 28 |
| | | | | | | RBFW2c | 599 | 594 |
| RBF Run #3 | Mg-ZSM-5 CAT-1 | 5% | 300 | 67 | 85 | RBFW3a | 1 | 1 |
| | | | | | | RBFW3b | 45 | 49 |
| | | | | | | RBFW3c | 94 | 94 |
| RBF Run #4 | Mg-ZSM-5 CAT-1 | 5% | 330 | 151 | 129 | RBFW4a | 3 | 3 |
| | | | | | | RBFW4b | 37 | 42 |
| | | | | | | RBFW4c | 103 | 102 |
| RBF Run #5 (without PET) | Mg-ZSM-5 CAT-1 | 5% | 340 | 0.3 | 0.2 | | | |
| RBF Run #6 | ZSM-5 CAT-1 + Mg-ZSM-5 CAT-1 | 5% | 360 | 0.31 | 0.47 | | | |
| RBF Run #7 | ZSM-5 CAT-1 + Mg-ZSM-5 CAT-1 | 5% | 360 | 4.0 | 3.9 | | | |

*FIG. 5C*

DECHLORINATION OF MIXED PLASTICS PYROLYSIS OILS USING DEVOLATILIZATION EXTRUSION AND CHLORIDE SCAVENGERS

This application is a national phase application under 35 U.S.C. § 371 of International Application No. PCT/IB2017/054313 filed Jul. 17, 2017, which claims priority to U.S. Provisional Patent Application No. 62/369,379 filed Aug. 1, 2016. The entire contents of each of the above-referenced disclosures is specifically incorporated by reference herein without disclaimer.

TECHNICAL FIELD

This disclosure relates the treatment of hydrocarbon streams via processes which include dechlorination.

BACKGROUND

Waste plastics may contain polyvinylchloride (PVC) and/or polyvinylidene chloride (PVDC). Through a pyrolysis process, waste plastics can be converted to gas and liquid products. These liquid products may contain paraffins, isoparaffins, olefins, naphthenes, and aromatic components along with organic chlorides in concentrations of hundreds of ppm. However, the liquid products of a pyrolysis process (pyrolysis oils) might not be used as a feedstock for steam crackers due to feed requirements of very low concentrations of chlorine and limited olefin content. Thus, there is an ongoing need to develop treatment methods for hydrocarbon feedstocks derived from waste plastics to meet certain steam cracker feed requirements.

BRIEF SUMMARY

Disclosed herein is a process for dechlorination of a hydrocarbon stream and/or a hydrocarbon stream precursor comprising introducing the hydrocarbon stream and/or hydrocarbon stream precursor, a first zeolitic catalyst, and a stripping gas to a devolatilization extruder (DE) to produce an extruder effluent, wherein the hydrocarbon stream and/or hydrocarbon stream precursor comprises one or more chloride compounds in an amount of equal to or greater than about 10 ppm chloride, based on the total weight of the hydrocarbon stream and/or hydrocarbon stream precursor, and wherein the extruder effluent comprises one or more chloride compounds in an amount of less than the chloride amount in the hydrocarbon stream and/or hydrocarbon stream precursor.

Also disclosed herein is a process for processing mixed plastic waste comprising (a) introducing a mixed plastic waste to a thermal cracking reactor to produce a hydrocarbon stream in a liquid phase and a gaseous stream, wherein the thermal cracking reactor is characterized by a temperature of from about 300° C. to about 400° C., and wherein the hydrocarbon stream comprises one or more chloride compounds in an amount of equal to or greater than about 10 ppm chloride, based on the total weight of the hydrocarbon stream, (b) introducing at least a portion of the hydrocarbon stream, a zeolitic catalyst, and a stripping gas to a devolatilization extruder (DE) to produce an extruder effluent and a spent stripping gas, wherein the DE is characterized by a temperature of from about 150° C. to about 450° C., wherein the DE is characterized by a pressure of from about 1 atm absolute to about $10^{-14}$ Torr, wherein the DE is characterized by a residence time of from about 0.1 minutes to about 1 hour or more, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds of the hydrocarbon stream, (c) introducing at least a portion of the extruder effluent to a catalytic cracker to produce a hydrocarbon product stream in a liquid phase and a gaseous product stream, wherein a viscosity of the hydrocarbon product stream is lower than a viscosity of the extruder effluent, and wherein the catalytic cracker is characterized by a temperature of from about 350° C. to about 730° C., (d) dechlorinating at least a portion of the hydrocarbon product stream to yield a polished hydrocarbon stream and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream comprises one or more chloride compounds in an amount of less than about 3 ppm chloride, based on the total weight of the polished hydrocarbon stream, (e) feeding at least a portion of the polished hydrocarbon stream to a steam cracker to yield a high value product, wherein the high value product comprises ethylene, propylene, butene, butadiene, aromatic compounds, or combinations thereof, (f) contacting at least a portion of the spent stripping gas from the DE, at least a portion of the gaseous stream from the thermal cracking reactor, at least a portion of the gaseous product stream from the catalytic cracker, or combinations thereof with a caustic solution to remove a portion of one or more chloride compounds from the spent stripping gas, the gaseous stream, the gaseous product stream, or combinations thereof and to produce a treated spent stripping gas, (g) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream, (h) separating olefin gases as a high value product from the treated gaseous stream to provide a separated treated gas stream, and (i) recycling at least a portion of the treated gaseous stream and/or at least a portion of the separated treated gas stream as stripping gas to the DE.

Further disclosed herein is a process for processing mixed plastic waste comprising (a) introducing a mixed plastic waste to a thermal cracking reactor to produce a hydrocarbon stream in a liquid phase and a gaseous stream, wherein the thermal cracking reactor is characterized by a temperature of from about 350° C. to about 730° C., and wherein the hydrocarbon stream comprises one or more chloride compounds in an amount of equal to or greater than about 10 ppm chloride, based on the total weight of the hydrocarbon stream, (b) introducing at least a portion of the hydrocarbon stream, a zeolitic catalyst, and a stripping gas to a devolatilization extruder (DE) to produce an extruder effluent and a spent stripping gas, wherein the DE is characterized by a temperature of from about 150° C. to about 450° C., wherein the DE is characterized by a pressure of from about 1 atm absolute to about $10^{-14}$ Torr, wherein the DE is characterized by a residence time of from about 0.1 minutes to about 1 hour or more, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds of the hydrocarbon stream, (c) dechlorinating at least a portion of the extruder effluent to yield a polished hydrocarbon stream and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream comprises one or more chloride compounds in an amount of less than about 3 ppm chloride, based on the total weight of the polished hydrocarbon stream, (d) feeding at least a portion of the polished hydrocarbon stream to a steam cracker to yield a high value product, wherein the high value product comprises ethylene, propylene, butene, butadiene, aromatic compounds, or combinations thereof, (e) contacting at least a portion of the spent stripping gas from the DE and/or at least a portion of the gaseous stream from the thermal cracking reactor with a caustic solution to remove a portion of one or more chloride compounds from the spent stripping gas gaseous stream and to produce a treated spent stripping gas, (f) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream, (g) separating olefin gases as a high value product from the treated gaseous stream to provide a separated treated gas stream, and (h) recycling at least a portion of the treated gaseous stream and/or at least a portion of the separated treated gas stream as stripping gas to the DE.

BRIEF DESCRIPTION OF THE DRAWINGS

FIGS. 1A, 1B, 1C, and 1D illustrate various configurations of dechlorination systems for processing mixed plastic waste;

FIGS. 5A, 5B and 5C display data tables for Example 4; and

DETAILED DESCRIPTION

Disclosed herein are processes and systems for dechlorination of a hydrocarbon stream and/or a hydrocarbon stream precursor, which include contacting the hydrocarbon stream and/or the hydrocarbon stream precursor with a zeolitic catalyst and a stripping gas in a devolatilization extrude (DE) to yield an extruder effluent. The processes may include producing a polished hydrocarbon stream from the extruder effluent, where the polished hydrocarbon stream has a reduced amount of chloride compounds compared to the amount of chloride compounds in the hydrocarbon stream and/or a hydrocarbon stream precursor.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "X or more" means that the named component is present in an amount of the value X, and values which are more than X.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Processes for dechlorination of a hydrocarbon stream and/or a hydrocarbon stream precursor are described in more detail with reference to FIGS. 1A, 1B, 1C, and 1D.

Figure 1A:
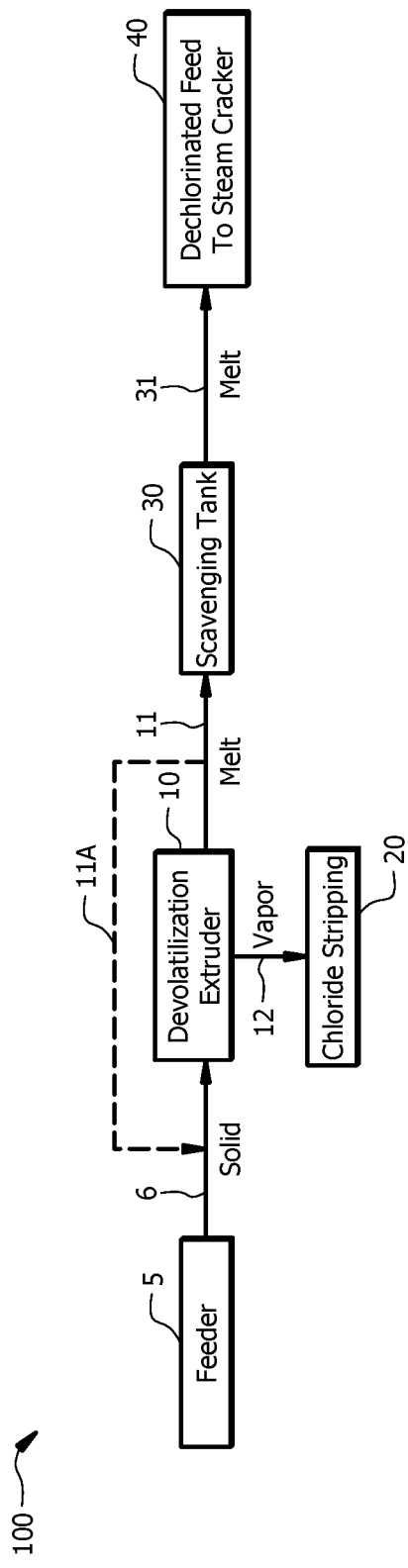

FIG. 1A illustrates a dechlorination system 100 which dechlorinates chloride compounds, and may additionally hydrogenate olefins, to provide for a dechlorinated feed that meets requirements for introduction to a steam cracker 40. The system 100 includes a feeder 5, a devolatilization extruder (DE) 10, a chloride stripping unit 20, a scavenging vessel or tank 30, and a steam cracker 40.

Figure 1B:
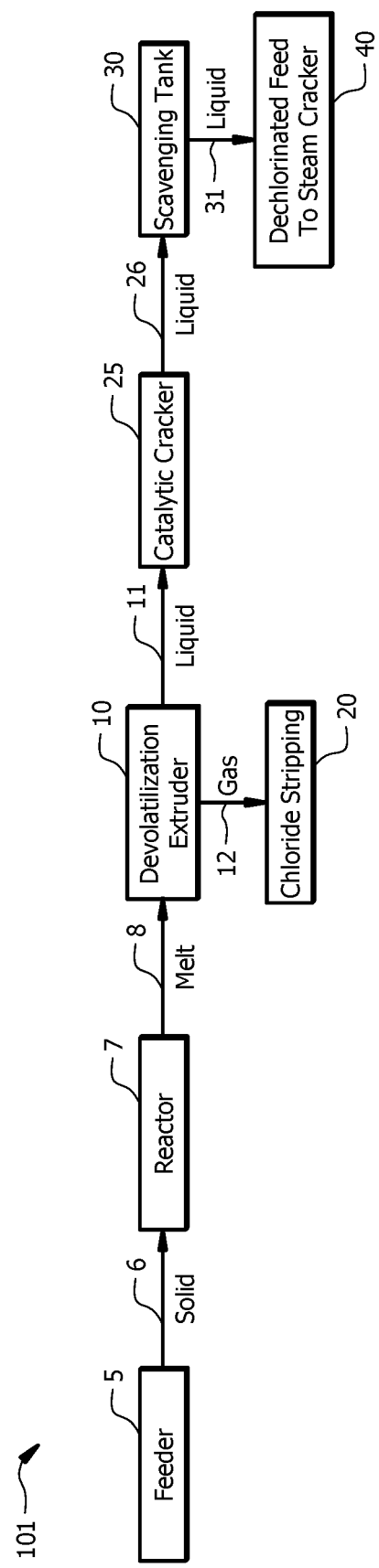

FIG. 1B illustrates a dechlorination system 101 which dechlorinates chloride compounds, and may additionally hydrogenate olefins, to provide for a dechlorinated feed that meets requirements for introduction to a steam cracker 40. The system 101 includes a feeder 5, a reactor 7, a DE 10, a chloride stripping unit 20, a catalytic cracker 25, a scavenging vessel or tank 30, and a steam cracker 40.

FIG. 1C illustrates a dechlorination system 102 which dechlorinates chloride compounds, and may additionally hydrogenate olefins, to provide for a dechlorinated feed that meets requirements for introduction to a steam cracker 40. The system 102 includes a feeder 5, a reactor 7, a DE 10, a chloride stripping unit 20, a scavenging vessel or tank 30, and a steam cracker 40.

FIG. 1D illustrates a dechlorination system 103 which dechlorinates chloride compounds, and may additionally hydrogenate olefins, to provide for a dechlorinated feed that meets requirements for introduction to a steam cracker 40. The system 103 includes a feeder 5, a DE 10, a chloride stripping unit 20, a catalytic cracker 25, a scavenging vessel or tank 30, and a steam cracker 40.

A hydrocarbon stream and/or a hydrocarbon stream precursor can be introduced to the DE 10. Referring to FIGS. 1A and 1D, a hydrocarbon stream precursor stream 6 (e.g., solid waste plastics, mixed plastics stream) comprising a mixed plastic waste can be conveyed from the feeder 5 to the DE 10. The feeder can comprise any suitable solids feeder for an extruder or a reactor, such as feed hoppers, densifiers, volumetric feeders, gravimetric feeders, Auger feeders, vibratory feeders, belt feeders, volumetric blenders, batch gravimetric blenders, loss-in-weight blenders (e.g., target rate, target weight), fluff feeders, feed hoppers with rotary valves, pulse feed systems, slug feeders, pneumatic feeders, and the like, or combinations thereof.

Waste plastics which can be loaded into or fed to the DE 10 or reactor 7 via hydrocarbon stream precursor stream 6 may include post-consumer waste plastics, such as mixed plastic waste. Mixed waste plastics can comprise chlorinated plastics (e.g., chlorinated polyethylene), polyvinylchloride (PVC), polyvinylidene chloride (PVDC), non-chlorinated plastics (e.g., polyolefins, polyethylene, polypropylene, polyethylene terephthalate (PET), polybutylene terephthalate, polystyrene, copolymers, etc.), and the like, or mixtures thereof. Waste plastics as disclosed herein can also include used tires. The mixed plastic waste can comprise PVC, PVDC, polyethylene terephthalate, polybutylene terephthalate, polyolefins, polystyrenes, and the like, or combinations thereof. Generally, waste plastics comprise long chain molecules or polymer hydrocarbons.

The hydrocarbon stream precursor stream 6 (e.g., mixed plastic waste) can comprise chloride in an amount of equal to or greater than about 10 ppm, alternatively equal to or greater than about 100 ppm, alternatively equal to or greater than about 200 ppm, alternatively equal to or greater than about 300 ppm, or alternatively equal to or greater than about 400 ppm, based on the total weight of the hydrocarbon stream precursor stream 6. The hydrocarbon stream precursor stream 6 can comprise PVC and/or PVDC in an amount of equal to or greater than about 400 ppm, alternatively equal to or greater than about 700 ppm, or alternatively equal to or greater than about 1,000 ppm, based on the total weight of the hydrocarbon stream precursor stream 6. As discussed in more detail herein, hydrocarbon stream precursor stream 6 can be fed directly to the DE 10 (e.g., as shown in FIGS. 1A and 1D) or alternatively can be fed to reactor 7 (e.g., as shown in FIGS. 1B and 1C) to produce hydrocarbon stream 8.

As shown in FIGS. 1B and 1C, a hydrocarbon stream precursor stream 6 comprising a mixed plastic waste can be conveyed from the feeder 5 to reactor 7. The reactor 7 can be any suitable thermal cracking reactor (e.g., thermal pyrolysis reactor, temperature controlled stirred tank batch reactor, continuous rotary kiln, twin screw extruder reactor, circulating fluidized bed reactors similar to fluid catalytic crackers, bubbling fluidized bed reactors, etc.). Generally, waste plastics can be introduced to a thermal cracking reactor, such as reactor 7, where they can be broken down into smaller hydrocarbon molecules (e.g., hydrocarbon stream), gas and carbon black, at elevated temperatures and in the absence of oxygen. A thermal cracking reactor, such as reactor 7, can be characterized by a temperature of from about 300° C. to about 400° C., alternatively from about 310° C. to about 390° C., or alternatively from about 325° C. to about 375° C. One of the advantages of using a thermal cracking reactor, such as reactor 7, is that inorganic contaminants (e.g., heavy metals; inert compounds, such as compounds inert with respect to cracking; etc.) in a thermal cracking reactor feed can be removed in a step of processing the thermal cracking reactor feed in the thermal cracking reactor, and products substantially free of contaminants (e.g., neat products) can be recovered from the thermal cracking reactor and can be further sent to other processing units downstream of the thermal cracking reactor, such as DE, catalytic cracker, etc.

A hydrocarbon stream 8 (e.g., melt stream) can be communicated from the reactor 7 to the DE 10 for further processing. The hydrocarbon stream 8 can generally include one or more hydrocarbons and one or more chloride compounds. The hydrocarbon stream 8 may additionally include hydrogen. The hydrocarbon stream 8 is generally in a molten phase (e.g., a viscous melt). A hydrogen ($H_2$) containing stream, a $C_1$ to $C_4$ hydrocarbon stream, an inert gas stream, and the like, or combinations thereof can be added to hydrocarbon stream 8 before entering the DE 10. Additionally or alternatively, a $H_2$ containing stream can be added to the DE 10 to enrich the DE environment with $H_2$, for example via a stripping gas fed directly to the DE independently of the hydrocarbon stream 8.

Chloride compounds which may be included in the hydrocarbon stream 8 include, but are not limited to, aliphatic chlorine-containing hydrocarbons, aromatic chlorine-containing hydrocarbons, and other chlorine-containing hydrocarbons. Examples of chlorine-containing hydrocarbons include, but are not limited to, 1-chlorohexane ($C_6H_{13}Cl$), 2-chloropentane ($C_5H_{11}Cl$), 3-chloro-3-methyl pentane ($C_6H_{13}Cl$), (2-chloroethyl) benzene ($C_8H_9Cl$), chlorobenzene ($C_6H_5Cl$), or combinations thereof. The amount of chloride in the hydrocarbon stream 8 may be 5 ppm, 6 ppm, 7 ppm, 8 ppm, 9 ppm, 10 ppm, 15 ppm, 20 ppm, 30 ppm, 40 ppm, 50 ppm, 100 ppm, 200 ppm, 300 ppm, 400 ppm, 500 ppm, 600 ppm, 700 ppm, 800 ppm, 900 ppm, 1,000 ppm, 1,100 ppm, 1,200 ppm, 1,300 ppm, 1,400 ppm, 1,500 ppm, 1,600 ppm, 1,700 ppm, 1,800 ppm, 1,900 ppm, 2,000 ppm or more based on the total weight of the hydrocarbon stream 8.

Examples of one or more hydrocarbons which may be included in the hydrocarbon stream 8 include paraffins (n-paraffin, iso-paraffin (i-paraffin), or both), olefins, naphthenes, aromatic hydrocarbons, or combinations thereof. When one or more hydrocarbons includes all the listed hydrocarbons, the group of hydrocarbons may be collectively referred to as a PONA feed (paraffin, olefin, naphthene, aromatics) or PIONA feed (n-paraffin, i-paraffin, olefin, naphthene, aromatics). A particular embodiment of the hydrocarbon stream 8 is pyrolysis oil recovered from pyrolysis of mixed solid waste plastic, for example a stream recovered from a thermal cracking reactor (e.g., reactor 7).

A process for dechlorination of a hydrocarbon stream and/or a hydrocarbon stream precursor can comprise introducing the hydrocarbon stream and/or hydrocarbon stream precursor, a first zeolitic catalyst, and a stripping gas to a DE to produce an extruder effluent.

Generally, a DE, such as DE 10, can receive a feed (e.g., hydrocarbon stream and/or a hydrocarbon stream precursor) that contains volatile components that have to be removed. When the DE feed is in solid form (e.g., hydrocarbon stream precursor stream 6 in FIGS. 1A and 1D), the DE heats the solid feed to a temperature effective to melt it and to allow the melted feed to flow under the conditions present in the extruder (e.g., temperature, pressure, residence time, etc.). When the DE feed is already melted prior to entering the extruder (e.g., hydrocarbon stream 8 FIGS. 1B and 1C), the DE heats the melted feed to a temperature effective to allow the melted feed to flow under the conditions present in the extruder. The DE temperature can be held above a boiling temperature of volatiles (e.g., chloride compounds, such as HCl) that are to be removed from the feed, to facilitate the recovery of the volatiles via a spent stripping gas stream 12. The DE can typically include an elongated chamber (usually referred to as an "extruder barrel") that contains one or more vents and one or more rotating screws. Volatilized compounds can escape from the extruder barrel through the vents (e.g., via spent stripping gas stream 12) as the melted feed traverses along the length of the extruder barrel towards an extruder exit point (e.g., extruder die). Extruder screw(s) can provide the mechanical force necessary to force the melted feed through the extruder barrel and subsequently out through the extruder exit point.

The DE 10 can be characterized by a temperature of from about 150° C. to about 450° C., alternatively from about 175° C. to about 425° C., or alternatively from about 200° C. to about 400° C.

The DE 10 can be characterized by a pressure of from about 1 atm absolute (atma) to about $10^{-14}$ Torr, alternatively from about 0.5 atma to about $10^{-7}$ Torr, or alternatively from about 0.1 atma to about $10^{-3}$ Torr. Alternatively, the DE 10 can be operated under vacuum conditions, i.e., at pressures below ambient pressure (e.g., below 1 atm).

The DE 10 can be characterized by a residence time of from about 0.1 minutes (min) to about 1 hour or more, alternatively from about 1 min to about 30 min, or alternatively from about 5 minutes to about 15 min. Generally, the residence time of an extruder refers to the average amount of time that a molecule spends in the extruder, e.g., the average amount of time that a hydrocarbon molecule of the hydrocarbon stream and/or hydrocarbon stream precursor spends in the DE.

The DE 10 can be configured to dechlorinate, and in some embodiments (e.g., where hydrogen is added to the DE via the feed stream and/or stripping gas), additionally hydrogenate components of the hydrocarbon stream 8 and/or a hydrocarbon stream precursor stream 6 fed to the DE 10. In the DE 10, the DE feed can be contacted with the first zeolitic catalyst, optionally in the presence of hydrogen that can be introduced to the DE 10 to facilitate hydrogenation reactions, to yield an extruder effluent 11.

The DE 10 may facilitate any reaction of the components of the DE feed in the presence of, or with, hydrogen. Reactions may occur as the addition of hydrogen atoms to double bonds of unsaturated molecules (e.g., olefins, aromatic compounds), resulting in saturated molecules (e.g., paraffins, i-paraffins, naphthenes). Additionally or alternatively, reactions in the DE 10 may cause a rupture of a bond of an organic compound, with a subsequent reaction and/or replacement of a heteroatom with hydrogen. Examples of reactions which may occur in the DE 10 include, but are not limited to, the hydrogenation of olefins, removal of heteroatoms from heteroatom-containing hydrocarbons (e.g., dechlorination), conversion of one or more aromatics to one or more cycloparaffins, isomerization of one or more normal paraffins to one or more i-paraffins, selective ring opening of one or more cycloparaffins to one or more i-paraffins, cracking of long chain length molecules to short chain length molecules, or combinations thereof.

A stripping gas can be introduced to the DE 10 to aid in the removal of volatiles entrained in the melted feed flowing through the extruder. As will be appreciated by one of skill in the art, and with the help of this disclosure, the stripping gas is generally insoluble in the melted feed flowing through the extruder. It is contemplated the stripping gas may be contacted with the DE feed in upward flow, downward flow, radial flow, or combinations thereof. Without wishing to be limited by theory, the striping gas may allow for the removal of chlorides prior to the chlorides having the opportunity to react (e.g., via recombinations reactions) and produce heavier chlorine-containing compounds that could not be easily removed by using the stripping gas.

Nonlimiting examples of stripping gas suitable for using in the DE of the present disclosure include nitrogen, hydrogen, argon, helium, $C_1$-$C_4$ gas hydrocarbons, alkanes, methane, ethane, propane, butane, isobutane, and the like, or combinations thereof.

The stripping gas can comprise hydrogen, for example to promote hydrogenation reactions within the DE. Accordingly, the DE 10 may facilitate any reaction of the components of the hydrocarbon stream 8 and/or the hydrocarbon stream precursor stream 6 in the presence of, or with, hydrogen. Reactions may occur, such as the addition of hydrogen atoms to double bonds of unsaturated molecules (e.g., olefins, aromatic compounds), resulting in saturated molecules (e.g., paraffins, i-paraffins, naphthenes). Additionally or alternatively, reactions in the DE 10 may cause a rupture of a bond of an organic compound, with a subsequent reaction and/or replacement of a heteroatom with hydrogen. Examples of reactions which may occur in the DE 10 include, but are not limited to, the hydrogenation of olefins, removal of heteroatoms from heteroatom-containing hydrocarbons (e.g., dechlorination), conversion of one or more aromatics to one or more cycloparaffins, isomerization of one or more normal paraffins to one or more i-paraffins, selective ring opening of one or more cycloparaffins to one or more i-paraffins, and the like, or combinations thereof.

A zeolitic catalyst can be introduced to the DE 10 to promote cracking of organic chlorides. The zeolitic catalyst can further promote cracking of other compounds present in the DE feed, thereby lowering the viscosity of the fluid (e.g., melted feed) flowing though the DE.

The zeolitic catalyst can comprise a fluid catalytic cracking catalyst, a molecular sieve, a zeolite, a hydrophobic zeolite, a ZSM-5 zeolite, a metal loaded zeolite (e.g., a zeolite loaded with one or more metals), and the like, or combinations thereof.

For purposes of the disclosure herein, a zeolitic catalyst introduced to the DE 10 can also be referred to as a "first zeolitic catalyst." The first zeolitic catalyst can be a mixture of two or more different zeolitic catalysts, wherein each zeolitic catalyst can be independently selected from the group consisting of a fluid catalytic cracking catalyst, a molecular sieve, a zeolite, a hydrophobic zeolite, a ZSM-5 zeolite, and a metal loaded zeolite.

A zeolitic catalyst can also be introduced as a fresh catalyst to a catalytic cracker 25 to promote catalytic cracking, as will be described in more detail later herein. For purposes of the disclosure herein, a zeolitic catalyst introduced separately (as opposed to first zeolitic catalyst communicated from the DE 10 to the catalytic cracker 25 via extruder effluent 11) to a catalytic cracker 25 can also be referred to as a "second zeolitic catalyst." The second zeolitic catalyst can comprise integrated catalyst particles obtained by embedding two or more different zeolitic catalysts in a matrix, wherein each zeolitic catalyst can be independently selected from the group consisting of a fluid catalytic cracking catalyst, a molecular sieve, a zeolite, a hydrophobic zeolite, a ZSM-5 zeolite, and a metal loaded zeolite. The matrix may be formed from a catalytically active material (e.g., an active alumina material, a binder material, such as alumina or silica), and an inert filler, such as kaolin. The zeolite component embedded in the matrix of the zeolitic catalyst can be present in the zeolitic catalyst in an amount of from 5 to 90%, alternatively between 10 to 80%, or alternatively between 10 to 50%, by weight of the zeolitic catalyst. Alternatively, the second zeolitic catalyst can be any one of the zeolitic catalysts as described above, or a physical mixture of two or more of the zeolitic catalysts described above. Zeolitic catalysts comprising zeolites embedded in a matrix are described in more detail in U.S. Pat. No. 9,212,318, which is incorporated by reference herein in its entirety.

The zeolitic catalyst (e.g., first zeolitic catalyst, second zeolitic catalyst) can be characterized by an average particle size of less than 100 microns, alternatively less than 10 microns, or alternatively less than 5 microns.

The first zeolitic catalyst can be present in the DE in an amount of less than about 10 wt. %, alternatively less than about 5 wt. %, alternatively less than about 3 wt. %, alternatively less than about 2 wt. %, alternatively less than about 1 wt. %, or alternatively less than about 0.5 wt. %, based on the total weight of the hydrocarbon stream and/or hydrocarbon stream precursor. As will be appreciated by one of skill in the art, and with the help of this disclosure, the use of larger catalyst particles in the DE (e.g., over 100 microns) and in larger amounts (e.g., over 10 wt. %) can be abrasive to the internals of the extruder, and could drive up the cost of the materials used for the extruder internals.

An extruder effluent 11 can be recovered from the DE 10. The extruder effluent can be an extruder melt effluent or an extruder liquid effluent. Where the DE feed comprises a solid feed (e.g., hydrocarbon stream precursor stream 6 of FIGS. 1A and 1D), the extruder effluent can be an extruder melt effluent, such as a viscous melt. Where the DE feed comprises a melted feed (e.g., hydrocarbon stream 8 of FIGS. 1B and 1C), the extruder effluent can be an extruder liquid effluent. Without wishing to be limited by theory, the liquid state of the extruder effluent is due to cracking of long chain polymeric melt to short chain hydrocarbons. For example, a viscosity of the extruder effluent 11 can be lower than a viscosity of the hydrocarbon stream 8. Without wishing to be limited by theory, cracking reactions in the DE 10 can lead to smaller size molecules in the extruder effluent when compared to the size of molecules in the DE feed, thereby leading to a decrease in viscosity. As will be appreciated by one of skill in the art, and with the help of this disclosure, the lower the viscosity of the DE feed, the lower the viscosity of the resulting extruder effluent. For example, when the DE feed is a solid, for a given residence time in the DE, the extruder effluent can be a viscous melt effluent; while for the same given residence time, when the DE feed is a melted feed (e.g., that has already been cracked, for example in the reactor 7) the extruder effluent can be a less viscous liquid effluent.

The extruder effluent 11 can comprise one or more chloride compounds in an amount of less than the chloride amount in the hydrocarbon stream 8 and/or hydrocarbon stream precursor 6. The amount of chloride compounds in the extruder effluent 11 may be less than 100 ppm, 50 ppm, 25 ppm, or 10 ppm, based on the total weight of the extruder effluent 11.

Where the stripping gas comprises hydrogen, due to hydrogenation reactions in the DE 10, the extruder effluent 11 may contain one or more olefins in an amount of less than about 1 wt. %, based on the total weight of the extruder effluent 11. It is contemplated that an amount of aromatic hydrocarbons in the extruder effluent 11 is less than an amount of aromatic hydrocarbons in the DE feed (e.g., hydrocarbon stream 8, hydrocarbon stream precursor stream 6) due to hydrogenation of at least a portion of the aromatic hydrocarbons in the DE feed. For example, aromatic hydrocarbons may be present in the extruder effluent 11 in an amount of less than 1 or more wt. %, based on the total weight of the extruder effluent 11.

The extruder effluent 11 can comprise at least a portion of the first zeolitic catalyst.

As shown in FIG. 1A, a portion 11a of the extruder effluent 11 can be recycled to the DE 10. Without wishing to be limited by theory, when the DE feed is a solid (e.g., as shown in FIG. 1A), for a given residence time, the extruder effluent can be a viscous melt effluent owing to the relatively larger size of molecules with a greater boiling point; while for the same given residence time, when the DE feed is a melted feed (e.g., that has already been cracked, for example in the reactor 7 as shown in FIGS. 1B and 1C) the extruder effluent can be a less viscous liquid effluent owing to the relatively smaller size of molecules with a lower boiling point. In order to reduce the size of the components of the extruder effluent 11, and consequently the boiling point of the extruder effluent 11, a portion 11a of the extruder effluent 11 can be returned to the DE 10 to further undergo cracking reactions to produce smaller size molecules with a lower boiling point. In some embodiments, the extruder effluent 11 can be characterized by a boiling end point of less than about 370° C. For example, equal to or greater than about 98 wt. %, alternatively 99 wt. %, or alternatively 99.9 wt. % of the extruder effluent 11 boils below 370° C.

The process for dechlorination of a hydrocarbon stream and/or a hydrocarbon stream precursor as disclosed herein can further comprise recycling to the DE 10 an amount (11a) of extruder effluent 11 effective to provide for a boiling end point of the extruder effluent of less than about 370° C. For example, from about 1 vol. % to about 80 vol. %, alternatively from about 3 vol. % to about 70 vol. %, or alternatively from about 5 vol. % to about 60 vol. % of the extruder effluent 11 can be recycled to the DE 10 via portion 11a.

A process for dechlorination of a hydrocarbon stream and/or a hydrocarbon stream precursor can comprise recovering a spent stripping gas stream 12 from the DE 10, wherein the spent stripping gas comprises at least a portion of the stripping gas, and one or more chloride compounds, wherein one or more chloride compounds comprise at least a portion of the chloride of the hydrocarbon stream 8 and/or hydrocarbon stream precursor stream 6.

At least a portion of the spent stripping gas stream 12 can be introduced to the chloride stripping unit 20 to remove at least a portion of the chloride compounds from the spent stripping gas stream 12. The chloride stripping unit 20 can comprise a scrubbing unit containing a caustic solution (e.g., a solution of sodium hydroxide and/or potassium hydroxide in water) which can remove (e.g., via reaction, adsorption, absorption, or combinations thereof) a first portion of chloride (e.g., chlorine-containing gases) from the spent stripping gas stream 12 to yield a treated spent stripping gas. At least a portion of the treated spent stripping gas can be further contacted with a chloride adsorber to remove a second portion of the chloride from the treated spent stripping gas to produce a treated gaseous stream. At least a portion of the treated gaseous stream can be recycled to the DE 10 as the stripping gas.

Nonlimiting examples of chloride adsorbers suitable for use in the present disclosure include attapulgite, activated carbon, dolomite, bentonite, iron oxide, goethite, hematite, magnetite, alumina, gamma alumina, silica, aluminosilicates, ion exchange resins, hydrotalcites, spinels, copper oxides, zinc oxide, sodium oxide, calcium oxide, magnesium oxide, metal loaded zeolites, molecular sieve 13X, and the like, or combinations thereof.

As shown in FIGS. 1B and 1D, a process for dechlorination of a hydrocarbon stream and/or a hydrocarbon stream precursor can further comprise introducing at least a portion of the extruder effluent 11 (e.g., comprising a first zeolitic catalyst) to a catalytic cracker 25 to produce a hydrocarbon product stream 26, wherein a viscosity of the hydrocarbon product stream 26 is lower than a viscosity of the extruder effluent 11. The catalytic cracker 25 can comprise a second zeolitic catalyst, wherein the second zeolitic catalyst can comprise any zeolitic catalyst described herein. The first zeolitic catalyst and the second zeolitic catalyst can be the same or different. The first zeolitic catalyst and the second zeolitic catalyst can promote cracking of compounds (e.g., hydrocarbons) present in the extruder effluent 11, thereby lowering the viscosity and the boiling point of the fluid flowing through the catalytic cracker 25. The catalytic cracker 25 can comprise any suitable reactor type previously described for the thermal reactor 7.

The catalytic cracker 25 can be characterized by a temperature of from about 350° C. to about 730° C., alternatively from about 375° C. to about 700° C., or alternatively from about 400° C. to about 650° C.

A process for dechlorination of a hydrocarbon stream and/or a hydrocarbon stream precursor can further comprise introducing at least a portion of the extruder effluent 11 (e.g., comprising a first zeolitic catalyst) to a thermal cracking reactor to produce a hydrocarbon product stream, wherein a viscosity of the hydrocarbon product stream is lower than a viscosity of the extruder effluent 11. For example, the catalytic cracker 25 shown in FIGS. 1B and 1D could be replaced with a thermal cracking reactor. The thermal cracking reactor can comprise any suitable thermal cracking reactor, such as the thermal cracking reactor described for reactor 7. The first zeolitic catalyst present in the extruder effluent 11 and the elevated temperature in the thermal cracking reactor (e.g., about 300° C. to about 730° C.) can promote cracking of compounds (e.g., hydrocarbons) present in the extruder effluent 11, thereby lowering the viscosity and the boiling point of the fluid flowing through the thermal cracking reactor.

A process for dechlorination of a hydrocarbon stream and/or a hydrocarbon stream precursor can further comprise introducing at least a portion of the extruder effluent 11 (e.g., as shown in FIGS. 1A and 1C) or at least a portion of the hydrocarbon product stream 26 (e.g., as shown in FIGS. 1B and 1D) to the scavenging vessel 30 to yield a polished hydrocarbon stream 31. The scavenging vessel 30 may be considered a polishing stage in which the extruder effluent 11 or the hydrocarbon product stream 26 is "polished" to further reduce the chloride content. The extruder effluent 11 and/or the hydrocarbon product stream 26 may contain chloride in an amount of greater than about 10 ppm, based on the weight of the extruder effluent 11 and/or the hydrocarbon product stream 26, respectively, which may not meet the requirements for the steam cracker 40. As such, the extruder effluent 11 or the hydrocarbon product stream 26 may be introduced to the scavenging vessel 30 for further chloride removal such that the polished hydrocarbon stream 31 flowing from the scavenging vessel 30 has an amount of one or more chlorides which meet the requirement of the steam cracker 40. In some aspects, when multiple DE units are present, some DE units could send extruder effluents to the catalytic cracker 25, while other DE units could send extruder effluents to the scavenging vessel 30, wherein the DE units which feed directly to the scavenging vessel 30 would have to be run at higher temperature and catalytic severity as compared to the other DE units that feed directly to the catalytic cracker 25.

The polished hydrocarbon stream 31 can comprise one or more chloride compounds in an amount of less than about 10 ppm chloride, alternatively less than about 5 ppm chloride, alternatively less than about 3 ppm chloride, alternatively less than about 1 ppm chloride, or alternatively less than about 0.5 ppm chloride, based on the total weight of the polished hydrocarbon stream 31.

The polished hydrocarbon stream 31 can be characterized by a boiling end point of less than about 370° C. For example, equal to or greater than about 98 wt. %, alternatively 99 wt. %, or alternatively 99.9 wt. % of the polished hydrocarbon stream 31 boils below 370° C.

Dechlorinating (e.g., polishing) the extruder effluent 11 or the hydrocarbon product stream 26 may include removing at least a portion of one or more chloride compounds remaining in the extruder effluent 11 or the hydrocarbon product stream 26, respectively, via adsorptive dechlorination to yield the polished hydrocarbon stream 31. Removal of remaining chloride compounds may occur in the scavenging vessel 30 in the form of one or more adsorption units. The one or more adsorption units may contain one or more chloride adsorbers, which can remove (e.g., via reaction, adsorption, absorption, or combinations thereof) a portion of one or more remaining chloride compounds from the extruder effluent 11 or the hydrocarbon product stream 26 to yield a polished hydrocarbon product which flows from the adsorption unit via polished hydrocarbon stream 31. One or more chloride compounds which are removed by sorbents (e.g., chloride adsorbers) in the adsorption unit may be recovered from the adsorption unit(s) via processes known in the art with the aid of this disclosure (e.g., regeneration of adsorption units operating in parallel). An example of an adsorption process suitable for use in the scavenging vessel 30 is found in U.S. Patent Publication No. 2015/053,589, which is hereby incorporated by reference.

Dechlorinating (e.g., polishing) the extruder effluent 11 or the hydrocarbon product stream 26 can comprise contacting at least a portion of the extruder effluent 11 or the hydrocarbon product stream 26 with a chloride adsorber; wherein the extruder effluent 11 comprises at least a portion of the first zeolitic catalyst; wherein the hydrocarbon product stream 26 comprises at least a portion of the first zeolitic catalyst and/or the second zeolitic catalyst; and wherein the chloride adsorber, the first zeolitic catalyst, the second zeolitic catalyst, or combinations thereof can provide for removing of at least a portion of one or more chloride compounds of the extruder effluent 11 or the hydrocarbon product stream 26.

Dechlorinating (e.g., polishing) the extruder effluent 11 or the hydrocarbon product stream 26 can occur at a temperature of from about 25° C. to about 225° C., alternatively from about 50° C. to about 200° C., or alternatively from about 75° C. to about 175° C.

Dechlorinating (e.g., polishing) the extruder effluent 11 or the hydrocarbon product stream 26 can occur under agitating, stirring, magnetic stirring, passing through a fixed or fluidized adsorption bed of adsorbents, or combinations thereof.

Dechlorinating (e.g., polishing) the extruder effluent 11 or the hydrocarbon product stream 26 can further comprise recovering a chlorine-containing gaseous stream from the scavenging vessel 30. At least a portion of the chloride can be removed from at least a portion of the chlorine-containing gaseous stream to produce a treated gaseous stream, for example by introducing at least a portion of the chlorine-containing gaseous stream to the chloride stripping unit 20. At least a portion of the treated gaseous stream can be recycled to the DE 10 as the stripping gas.

Chloride adsorbers and/or zeolitic catalysts can be removed from the scavenging vessel 30 as a solid residue, wherein the polished hydrocarbon stream 31 can be substantially free of solids such as chloride adsorbers and/or zeolitic catalysts. The solid residue comprises chlorides from streams 11 and/or 26. The solid residue can be further subjected to a waste processing step.

A process for dechlorination of a hydrocarbon stream and/or a hydrocarbon stream precursor can further comprise feeding at least a portion of the polished hydrocarbon stream 31 to the steam cracker 40 to yield a high value product, wherein the polished hydrocarbon stream 31 has a boiling end point of less than about 370° C., and wherein the high value product comprises ethylene, propylene, butene, butadiene, aromatic compounds, and the like, or combinations thereof.

Steam cracker 40 generally has feed specification requirements (e.g., requires a dechlorinated feed with low olefin content) depending on the individual steam cracker's operating constraints. First, the steam cracker 40 requires the amount of chloride compounds in the feed to the steam cracker 40 to be very low e.g. in ppm levels (for example, less than 10 ppm). Second, the steam cracker 40 requires the amount of olefins in a stream fed to the steam cracker 40 to be low in wt. % (for example, less than 1 wt. %). The steam cracker 40 cracks molecules or cleaves at elevated temperatures carbon-carbon bonds of the components in the polished hydrocarbon stream 31 in the presence of steam to yield high value products.

A process for processing mixed plastic waste can comprise the steps of (a) introducing a zeolitic catalyst, a stripping gas, and a hydrocarbon stream precursor stream 6 (e.g., a mixed plastic waste stream from a feeder 5) to a DE 10 to produce an extruder effluent 11 and a spent stripping gas 12; wherein the hydrocarbon stream precursor stream 6 comprises one or more chloride compounds in an amount of equal to or greater than about 10 ppm chloride, based on the total weight of the hydrocarbon stream precursor stream 6; wherein the DE 10 is characterized by a temperature of from about 150° C. to about 450° C.; wherein the DE 10 is characterized by a pressure of from about 1 atm absolute to about $10^{-14}$ Torr; wherein the DE 10 is characterized by a residence time of from about 0.1 minutes to about 1 hour or more; wherein the extruder effluent 11 comprises one or more chloride compounds in an amount of less than the chloride amount in the hydrocarbon stream precursor stream 6; and wherein the spent stripping gas 12 comprises at least a portion of the stripping gas and at least a portion of one or more chloride compounds of hydrocarbon stream precursor stream 6; (b) recycling to the DE 10 an amount 11a of extruder effluent 11 effective to provide for a boiling end point of the extruder effluent 11 of less than about 370° C.; (c) dechlorinating at least a portion of the extruder effluent 11 in a scavenging vessel 30 to yield a polished hydrocarbon stream 31 and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream 31 comprises one or more chloride compounds in an amount of less than about 3 ppm chloride, based on the total weight of the polished hydrocarbon stream 31; (d) feeding at least a portion of the polished hydrocarbon stream 31 to a steam cracker 40 to yield a high value product, wherein the high value product comprises ethylene, propylene, butene, butadiene, aromatic compounds, or combinations thereof; (e) contacting at least a portion of the spent stripping gas 12 from the DE 10 with a caustic solution in a stripping unit 20 to remove a portion of one or more chloride compounds from the spent stripping gas 12 and to produce a treated spent stripping gas; (f) contacting at least a portion of the treated spent stripping gas with a chloride adsorber to remove at least a portion of the chloride from the treated spent stripping gas and to produce a treated gaseous stream; (g) separating olefin gases as a high value product from the treated gaseous stream to provide a separated treated gas stream; and (h) recycling at least a portion of the treated gaseous stream and/or at least a portion of the separated treated gas stream as stripping gas to the DE 10. For example, the dechlorination process can be carried out by employing the dechlorination system 100 as illustrated in FIG. 1A, which can be used for solid mixed plastic waste (MPW) feed conversion to dechlorinated melt via DE and chemical scavenging steps. The dechlorination system 100 can be used for direct dechlorination of solid MPW feeds in the presence of a suitable catalyst (e.g., zeolitic catalyst) and hydrogen/nitrogen (e.g., stripping gas) with a high chloride removal efficiency.

A process for processing mixed plastic waste can comprise the steps of (a) introducing a hydrocarbon stream precursor stream 6 (e.g., a mixed plastic waste stream from a feeder 5) to a thermal cracking reactor 7 to produce a hydrocarbon stream 8 in a liquid phase and a gaseous stream, wherein the thermal cracking reactor 7 is characterized by a temperature of from about 300° C. to about 400° C., and wherein the hydrocarbon stream 8 comprises one or more chloride compounds in an amount of equal to or greater than about 10 ppm chloride, based on the total weight of the hydrocarbon stream 8; (b) introducing at least a portion of the hydrocarbon stream 8, a zeolitic catalyst, and a stripping gas to a DE 10 to produce an extruder effluent 11 and a spent stripping gas 12, wherein the DE 10 is characterized by a temperature of from about 150° C. to about 450° C., wherein the DE 10 is characterized by a pressure of from about 1 atm absolute to about $10^{-14}$ Torr, wherein the DE 10 is characterized by a residence time of from about 0.1 minutes to about 1 hour or more, wherein the extruder effluent 11 comprises one or more chloride compounds in an amount of less than the chloride amount in the hydrocarbon stream 8, wherein a viscosity of the extruder effluent 11 is lower than a viscosity of the hydrocarbon stream 8, and wherein the spent stripping gas 12 comprises at least a portion of the stripping gas and at least a portion of one or more chloride compounds of the hydrocarbon stream 8; (c) introducing at least a portion of the extruder effluent 11 to a catalytic cracker 25 to produce a hydrocarbon product stream 26 in a liquid phase and a gaseous product stream, wherein a viscosity of the hydrocarbon product stream 26 is lower than a viscosity of the extruder effluent 11, and wherein the catalytic cracker 25 is characterized by a temperature of from about 350° C. to about 730° C.; (d) dechlorinating at least a portion of the hydrocarbon product stream 26 in a scavenging vessel 30 to yield a polished hydrocarbon stream 31 and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream 31 comprises one or more chloride compounds in an amount of less than about 3 ppm chloride, based on the total weight of the polished hydrocarbon stream 31; (e) feeding at least a portion of the polished hydrocarbon stream 31 to a steam cracker 40 to yield a high value product, wherein the high value product comprises ethylene, propylene, butene, butadiene, aromatic compounds, or combinations thereof; (f) contacting at least a portion of the spent stripping gas 12 from the DE 10, at least a portion of the gaseous stream from the thermal cracking reactor 7, at least a portion of the gaseous product stream from the catalytic cracker 25, or combinations thereof with a caustic solution in a chloride stripping unit 20 to remove a portion of one or more chloride compounds from the spent stripping gas 12, the gaseous stream, the gaseous product stream, or combinations thereof and to produce a treated spent stripping gas; (g) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream; (h) separating olefin gases as a high value product from the treated gaseous stream to provide a separated treated gas stream; and (i) recycling at least a portion of the treated gaseous stream and/or at least a portion of the separated treated gas stream as stripping gas to the DE 10. For example, the dechlorination process can be carried out by employing the dechlorination system 101 as illustrated in FIG. 1B, which can be used for solid MPW feed conversion all the way to a dechlorinated liquid (e.g., polished hydrocarbon stream 31) via thermal cracking, devolatilization extrusion, catalytic cracking and chemical scavenging steps. Organochloride compounds are known to be formed during the liberation of HCl in the presence of PET. Hence, the use of dechlorination system 101 can be advantageous for handling MPW feeds with significant quantities of PET (5-10 wt. %). In some embodiments, the mixed plastic waste feed can comprise (i) PVC and/or PVDC in an amount of equal to or greater than about 400 ppm, alternatively equal to or greater than about 700 ppm, or alternatively equal to or greater than about 1,000 ppm, based on the total weight of the mixed plastic waste; and (ii) PET in an amount of equal to or greater than about 400 ppm, alternatively equal to or greater than about 700 ppm, or alternatively equal to or greater than about 1,000 ppm, based on the total weight of the mixed plastic waste. During the step (a) of thermal cracking, the solid MPW feed can be converted to a viscous melt that can be devolatilized during step (b) by using a DE 10 in the presence of a solid catalyst (e.g., zeolitic catalyst) and a gas purge (e.g., stripping gas) containing $N_2$, $H_2$, $C_1$ to $C_4$ hydrocarbons, or combinations thereof. However, the use of large amounts of catalyst in a DE should be avoided as the catalyst particles can be abrasive for the DE material of construction (MOC). Most chlorine-containing compounds formed during the thermal cracking step (a) and DE step (b) can escape in the form of HCl. Without wishing to be limited by theory, since PET can interact with HCl and form organic chlorides such as chloroethyl esters of terephthalic and benzoic acids, these organic chlorides need to be further cracked using a catalytic cracking step (c). Most of the chloride compounds can be removed during catalytic cracking step (c), but trace levels of chlorides at a ppm level or below can still be present in a condensable vapor fraction (e.g., hydrocarbon product stream 26) obtained from the catalytic cracker 25. Scavenging step (d) can be useful as a polishing step for the complete removal of chlorides to yield a final liquid stream produced (e.g., polished hydrocarbon stream 31). The use of multiple steps in a series combination as shown in FIG. 1B can have an increased potential to dechlorinate the MPW feed below a detection limit of a total chloride analyzer.

Figure 2:
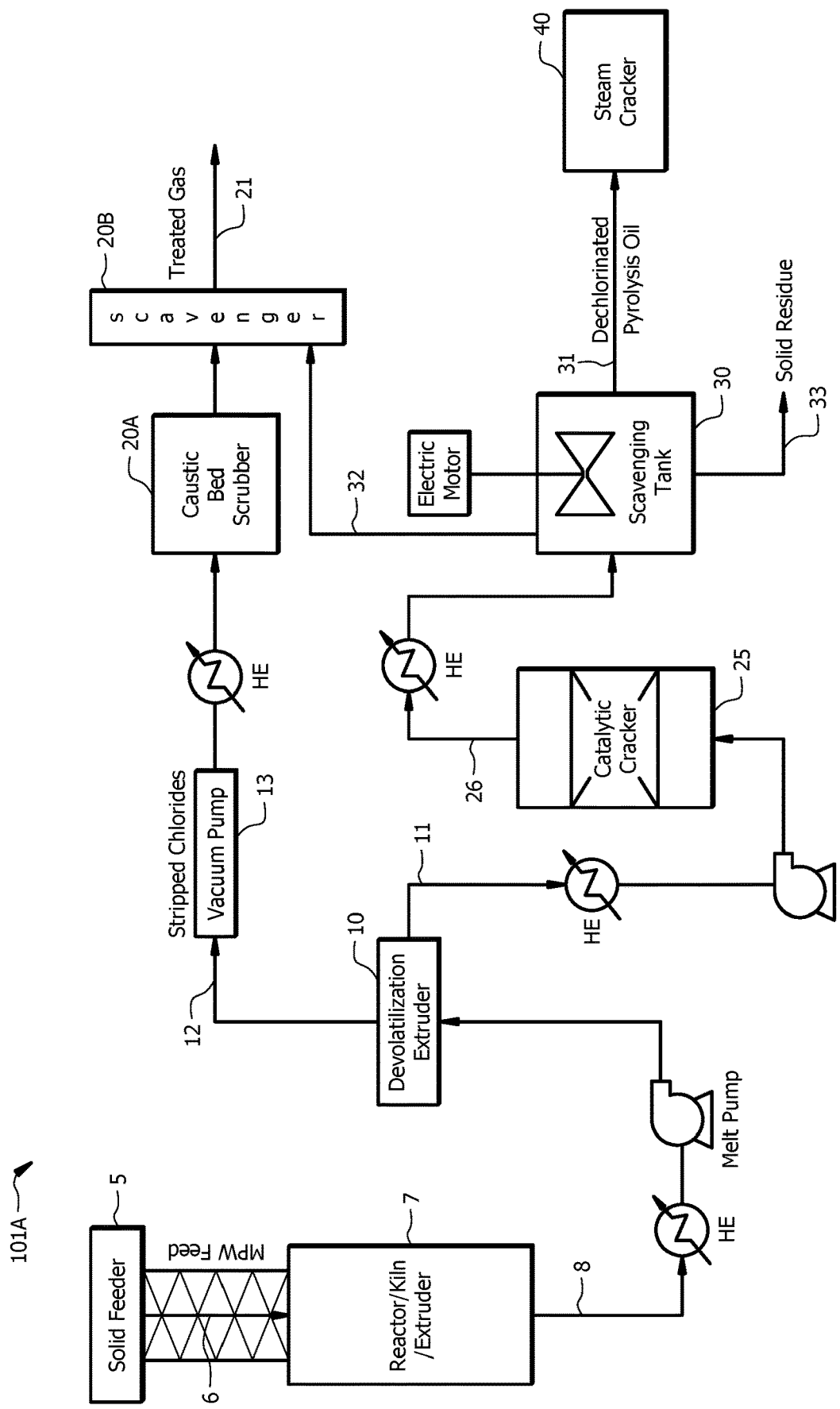
FIG. 2 displays a process flow diagram for a declorination system.

The dechlorination system 101 can comprise a dechlorination system 101a as illustrated in FIG. 2, combining processes such as pyrolysis, DE, catalytic cracking and chemical scavenging. As shown in FIG. 2, these processes utilize multiple heat exchangers (HE) to independently regulate fluid temperature upstream or downstream of process units, as required. Pyrolysis of MPW comprising PVC and PET can be performed in reactor 7, which can comprise either a temperature controlled stirred tank batch reactor, a continuous rotary kiln, a twin screw extruder reactor, a circulating fluidized bed reactor similar to a fluid catalytic cracker, or a bubbling fluidized bed reactor. MPW can be communicated from feeder 5 to reactor 7 via MPW feed stream 6. The resulting product (e.g., hydrocarbon stream 8) from the pyrolysis process can be a partially cracked hydrocarbon stream, where the thermal cracking in reactor 7 occurred under mild temperature conditions of 200-400° C. to form a viscous melt (e.g., hydrocarbon stream 8). In some embodiments, a low temperature can be used for pyrolysis reactions to protect reactor equipment and other assets from chloride corrosion as PVC is known to start degrading around about 240° C. Hydrogen chloride formed from thermal cracking can be stripped by using DE 10 and a vacuum pump 13. A temperature in DE 10 can be maintained around 200-450° C. along with a high vacuum pressure ($10^{-9}$ Torr to $10^{-12}$ Torr) to assist in devolatilization and cracking reactions. A temperature in the DE 10 is higher than a temperature in the thermal reactor 7. During devolatilization in DE 10, the melt (e.g., hydrocarbon stream 8) viscosity can be reduced by about an order of magnitude to produce a freely flowing fluid (e.g., extruder effluent 11). A caustic bed scrubber 20a using NaOH or KOH solution can be used to scrub the inorganic chlorides from the vapor stream 12 obtained from DE 10. However, any carry over of the light volatile organochloride compounds (VOCC) and/or HCl in the vapor phase 12 from DE 10 can be treated with another type of adsorbent or column or scavenger bed 20b downstream to the caustic bed scrubber 20a to produce a treated gaseous stream 21. The treated gaseous stream 21 can be recycled to the DE 10 as the stripping gas. A liquid stream (e.g., extruder effluent 11) obtained from DE 10 can be further cracked in a catalytic cracker 25 under a temperature range of 350-730° C. using a suitable zeolitic catalyst such as ZSM-5 and/or a fluid catalytic cracking catalyst in a fixed or fluidized bed reactor configuration, to ensure cracking of organic chlorides. A vapor condensed stream (e.g., hydrocarbon product stream 26) obtained from catalytic cracker unit 25 can be subjected to a chemical scavenging step in a stirred tank reactor (e.g., scavenging vessel 30). This scavenging step can employ any suitable scavengers, for example low cost scavengers such as Fuller's Earth, activated carbon, dolomite, bentonite, iron oxide, or even spent catalyst, independently or in any suitable combination. A mild temperature of 100-200° C. and intense mixing conditions can be employed in a batch type system in scavenging vessel 30 to ensure efficient scavenging and remnant chloride removal to form a final hydrocarbon liquid stream (e.g., polished hydrocarbon stream 31) having chloride at ppm and sub-ppm levels. The polished hydrocarbon stream 31 can be further cracked in a steam cracker 40 to produce high value products. A chlorine-containing gaseous stream 32 can be recovered from the scavenging vessel 30 and sent for further treatment to scavenger bed 20b. Spent scavengers employed in the scavenging vessel 30 can be recovered as a solid residue stream 33 from the scavenging vessel 30, and can be sent to a waste treatment step.

A process for processing mixed plastic waste can comprise the steps of (a) introducing a hydrocarbon stream precursor stream 6 (e.g., a mixed plastic waste stream from a feeder 5) to a thermal cracking reactor 7 to produce a hydrocarbon stream 8 in a liquid phase and a gaseous stream, wherein the thermal cracking reactor 7 is characterized by a temperature of from about 300° C. to about 400° C., and wherein the hydrocarbon stream 8 comprises one or more chloride compounds in an amount of equal to or greater than about 10 ppm chloride, based on the total weight of the hydrocarbon stream 8; (b) introducing at least a portion of the hydrocarbon stream 8, a zeolitic catalyst, and a stripping gas to a DE 10 to produce an extruder effluent 11 and a spent stripping gas 12, wherein the DE 10 is characterized by a temperature of from about 150° C. to about 450° C., wherein the DE 10 is characterized by a pressure of from about 1 atm absolute to about $10^{-14}$ Torr, wherein the DE 10 is characterized by a residence time of from about 0.1 minutes to about 1 hour or more, wherein the extruder effluent 11 comprises one or more chloride compounds in an amount of less than the chloride amount in the hydrocarbon stream 8, wherein a viscosity of the extruder effluent 11 is lower than a viscosity of the hydrocarbon stream 8, and wherein the spent stripping gas 12 comprises at least a portion of the stripping gas and at least a portion of one or more chloride compounds of the hydrocarbon stream 8; (c) dechlorinating at least a portion of the extruder effluent 11 in a catalytic cracker 25 and/or a scavenging vessel 30 to yield a polished hydrocarbon stream 31 and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream 31 comprises one or more chloride compounds in an amount of less than about 10 ppm chloride, based on the total weight of the polished hydrocarbon stream 31; (d) feeding at least a portion of the polished hydrocarbon stream 31 to a steam cracker 40 to yield a high value product, wherein the high value product comprises ethylene, propylene, butene, butadiene, aromatic compounds, or combinations thereof; (e) contacting at least a portion of the spent stripping gas 12 from the DE 10 and/or at least a portion of the gaseous stream from the thermal cracking reactor 7 with a caustic solution in a chloride stripping unit 20 to remove a portion of one or more chloride compounds from the spent stripping gas 12 and/or gaseous stream and to produce a treated spent stripping gas; (f) contacting at least a portion of the treated spent stripping gas and/or at least a portion of the chlorine-containing gaseous stream with a chloride adsorber to remove at least a portion of the chloride from at the treated spent stripping gas and/or at least a portion of chloride from the chlorine-containing gaseous stream and to produce a treated gaseous stream; (g) separating olefin gases as a high value product from the treated gaseous stream to provide a separated treated gas stream; and (h) recycling at least a portion of the treated gaseous stream and/or at least a portion of the separated treated gas stream as the stripping gas to the DE 10. For example, the dechlorination process can be carried out by employing the dechlorination system 102 as illustrated in FIG. 1C, which can be used for solid MPW feed conversion all the way to dechlorinated liquid via thermal cracking, DE and chemical scavenging. The dechlorination system 102 can be useful for feeds without PET, to lower the potential of organic chloride formation during the thermal cracking and DE steps.

A process for processing mixed plastic waste can comprise the steps of (a) introducing a zeolitic catalyst, a stripping gas, and a hydrocarbon stream precursor stream 6 (e.g., a mixed plastic waste stream from a feeder 5) to a DE 10 to produce an extruder effluent 11 and a spent stripping gas 12; wherein the hydrocarbon stream precursor stream 6 comprises one or more chloride compounds in an amount of equal to or greater than about 10 ppm chloride, based on the total weight of the hydrocarbon stream precursor stream 6; wherein the DE 10 is characterized by a temperature of from about 150° C. to about 450° C.; wherein the DE 10 is characterized by a pressure of from about 1 atm absolute to about $10^{-14}$ Torr; wherein the DE 10 is characterized by a residence time of from about 0.1 minutes to about 1 hour or more; wherein the extruder effluent 11 comprises one or more chloride compounds in an amount of less than the chloride amount in the hydrocarbon stream precursor stream 6; and wherein the spent stripping gas 12 comprises at least a portion of the stripping gas and at least a portion of one or more chloride compounds of hydrocarbon stream precursor stream 6; (b) introducing at least a portion of the extruder effluent 11 to a catalytic cracker 25 to produce a hydrocarbon product stream 26 in a liquid phase and a gaseous product stream, wherein a viscosity of the hydrocarbon product stream 26 is lower than a viscosity of the extruder effluent 11, and wherein the catalytic cracker 25 is characterized by a temperature of from about 350° C. to about 730° C.; (c) dechlorinating at least a portion of the hydrocarbon product stream 26 in a scavenging vessel 30 to yield a polished hydrocarbon stream 31 and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream 31 comprises one or more chloride compounds in an amount of less than about 3 ppm chloride, based on the total weight of the polished hydrocarbon stream 31; (d) feeding at least a portion of the polished hydrocarbon stream 31 to a steam cracker 40 to yield a high value product, wherein the high value product comprises ethylene, propylene, butene, butadiene, aromatic compounds, or combinations thereof; (e) contacting at least a portion of the spent stripping gas 12 from the DE 10, at least a portion of the gaseous product stream from the catalytic cracker 25, or combinations thereof with a caustic solution in a chloride stripping unit 20 to remove a portion of one or more chloride compounds from the spent stripping gas 12, the gaseous product stream, or combinations thereof and to produce a treated spent stripping gas; (f) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream; (g) separating olefin gases as a high value product from the treated gaseous stream to provide a separated treated gas stream; and (h) recycling at least a portion of the treated gaseous stream and/or at least a portion of the separated treated gas stream as stripping gas to the DE 10. For example, the dechlorination process can be carried out by employing the dechlorination system 103 as illustrated in FIG. 1D, which can be used for solid MPW feed conversion all the way to a dechlorinated liquid (e.g., polished hydrocarbon stream 31) via devolatilization extrusion, catalytic cracking and chemical scavenging steps.

Processes for processing mixed plastic waste as disclosed herein can advantageously display improvements in one or more process characteristics when compared to an otherwise similar process that does not integrate a devolatilization extruder for processing plastic waste in the presence of a catalyst and a stripping gas. Processes for processing mixed plastic waste as disclosed herein can advantageously reduce the total chloride content in pyrolysis oils from percent to ppm levels, which can be difficult to achieve in a single step process (e.g., in a DE) without equipment corrosion issues. Processes for processing mixed plastic waste as disclosed herein can advantageously employ low-cost scavengers (e.g., zeolitic catalysts, chloride adsorbers) to achieve high dechlorination efficiency of contaminated hydrocarbon streams produced from mixed plastic waste pyrolysis.

The dechlorination system 100 as illustrated in FIG. 1A can advantageously utilize a minimum number of treatment steps, and as such can advantageously be cost-effective for chloride removal from MPW feed, by minimizing both capital and operational expenditures. As will be appreciated by one of skill in the art, and with the help of this disclosure, the dechlorination system 100 may require more expensive MOC for DE due to its handling of majority of the load of dechlorination. Further, as will be appreciated by one of skill in the art, and with the help of this disclosure, increased residence times of melt in DE may be required to assist in the simultaneous lowering of melt viscosity and cracking of organic chlorides formed prior to a scavenging/polishing step, and as such, a portion of the extruder effluent may be recycled to the DE.

The dechlorination system 101 as illustrated in FIG. 1B can be advantageously used for processing PET rich MPW feed because of the multi-step cracking and chloride removal capability comprising of both inorganic and organic compounds. A scavenging step can be a polishing step to achieve high dechlorination efficiency in the overall process scheme.

Figure 3:
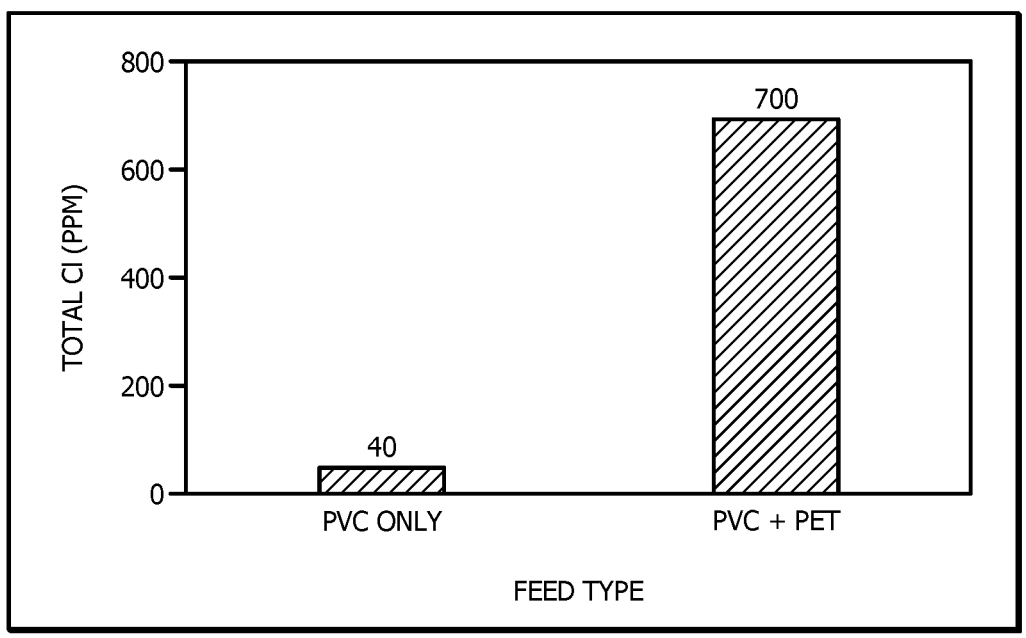
FIG. 3 displays a graph of chloride level for different types of processed plastic waste.

The dechlorination system 102 as illustrated in FIG. 1C can be advantageously used for processing PVC rich MPW feed by lowering the melt viscosity via DE. Without wishing to be limited by theory, due to the nature of feed, the dechlorination system 102 will allow for the formation of fewer organic chlorides when compared to dechlorination system 101, for example. As it can be seen in FIG. 3, the PVC containing MPW feed can form significantly lower ppm of chlorides than the PVC and PET containing MPW feed. After a thermal cracking step in the dechlorination system 102, DE can be considered as a secondary semi-catalytic cracking step. The polishing step in the scavenging vessel can advantageously remove non-cracked organic chlorides.

The dechlorination system 103 as illustrated in FIG. 1D can avoid the use of a thermal reactor, and as such can advantageously remove one step from the process for processing mixed plastic waste as disclosed herein, while achieving a desired level of dechlorination. Additional advantages of the processes for processing mixed plastic waste as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Example 1

The pyrolysis of mixed plastic waste (MPW) comprising 19 g high-density polyethylene (HDPE), 21 g low-density polyethylene (LDPE), 24 g polypropylene (PP), 18 g linear low-density polyethylene (LLDPE), 11 g polystyrene (PS), 7 g polyethylene terephthalate (PET), and 2 g polyvinylchloride (PVC) was investigated. A low severity pyrolysis was performed with PVC present in the feed. An amount of 102 g of mixed plastic waste as above comprising PVC was mixed with 2 wt. % of ZSM-5 zeolite catalyst powder and heated in a round bottom flask fitted with a condenser. The round bottom flask was maintained at 360° C. for 1 hour. The liquid product had 60 ppmw chlorides. The liquid product chloride content was measured using a Chlora M-series analyzer (monochromatic wavelength dispersive X-ray Fluorescence technique, ASTM D7536). A similar experiment conducted with head space purging of the round bottom flask with $N_2$ gas provided a liquid product with no detectable chloride content. These results demonstrate the possible benefits of head space purging in a devolatilization extruder (DE) unit to enhance dechlorination.

Example 2

Figure 4:
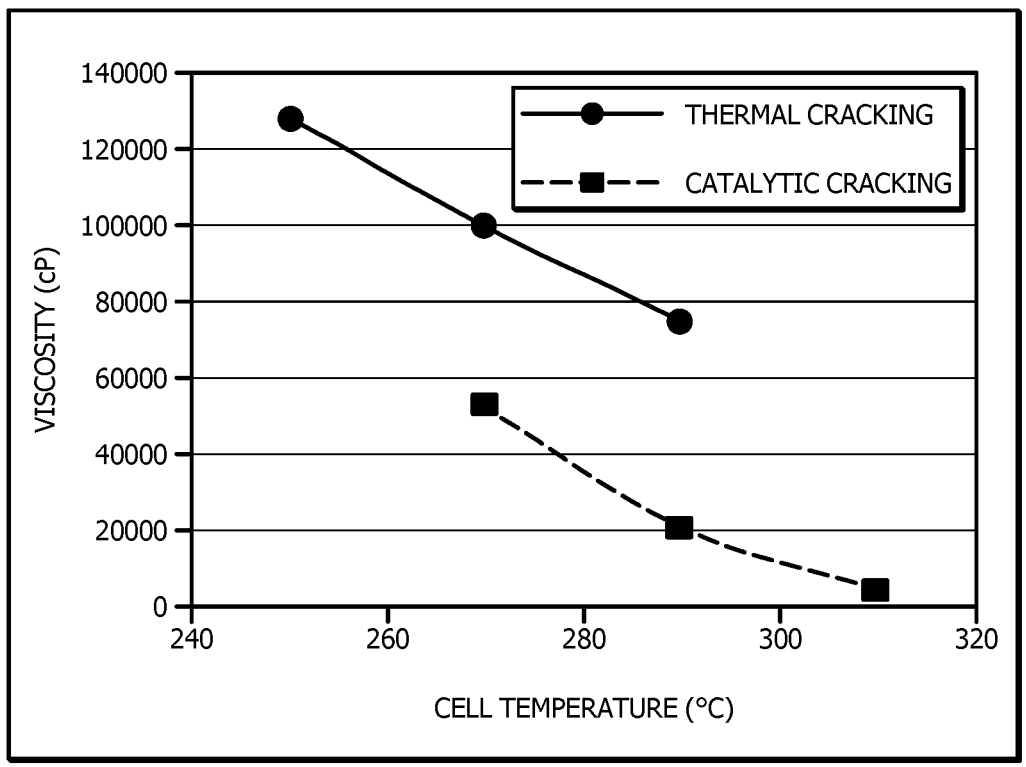
FIG. 4 displays a graph of melt viscosity as a function of temperature.

The viscosity of a pyrolysis product obtained from mixed plastic waste was investigated for thermal pyrolysis and catalytic pyrolysis. The pyrolysis product from catalytic cracking (as described in Example 1, with catalyst) was heated to the required temperature and the viscosity was measured using a Brookfield digital viscometer at that temperature. FIG. 4 displays an example of a variation of melt viscosity as a function of temperature, wherein the results for thermal cracking (as described in Example 1, without catalyst) were acquired in situ in a Goettfrert high shear capillary rheometer 6000 at a shear rate of 1000 $s^{-1}$, and where it can be seen that the viscosity of the melt produced from MPW decreases as a function of rheometer cell temperature. Without wishing to be limited by theory, measurement values displayed in FIG. 4 can mimic melt flow behavior in DE 10. As shown in FIG. 4, the percentage viscosity reduction of the melt was 40.63% as the temperature increased from 250° C. to 290° C., for thermal cracking. However, for catalytic cracking, in the presence of 2% ZSM-5 catalyst, the viscosity reduction was much higher (88.89%) with the increase in temperature from 270° C. to 310° C. This clearly indicates that the use of catalysts in small quantities can assist in lowering the melt viscosity significantly so the MPW feed dechlorination can be achieved efficiently in further devolatilization and scavenging steps.

Example 3

Processing of plastic waste was conducted by hydroprocessing followed by a subsequent polishing step for further chloride removal.

Hydroprocessing of plastic waste was conducted in a fixed bed reactor located inside a 3-zone split-tube furnace. The reactor internal diameter was 13.8 mm and had concentrically located bed thermowell of 3 mm outer diameter. The reactor was 48.6 cm long. Commercial hydroprocessing catalyst of Co—Mo on alumina (8 g bone dry weight) was broken along the length to particles of 1.5 mm long and diluted with SiC in the ratio of 60% SiC to 40% catalyst to give a mean particle diameter of 0.34 mm. This was done to avoid slip through of the chlorides due to wall slip or channeling in the small diameter reactor. Pre-heating bed and post-catalyst inert beds was provided in the form of 1 mm glass beads. The catalyst bed temperature was controlled to isothermal by varying the controlled furnace zone skin temperatures. The hydroprocessing catalyst was sulphided using 3 wt. % S in hexadecane (S was introduced as dimethyl disulphide). Liquid feed (i.e., hydrocarbon stream) was fed through a metering pump and $H_2$ gas was fed using a mass flow controller. The reactor effluent gases (e.g., a hydrocarbon product) were cooled to condense out the liquids (i.e., treated hydrocarbon stream in the form of a liquid product) under pressure while allowing non-condensed gases (e.g., containing chloride(s), chlorine, hydrogen sulphide, or combinations thereof) to separate. Following liquid condensation, the pressure of the liquids was reduced and effluent gas flow was scrubbed in a caustic scrubber and measured using a drum-type wet gas meter. The effluent gas flow was analyzed using a refinery gas analyzer (a custom gas analyzer from M/s AC Analyticals BV). The chloride content was measured as described in Example 1.

The product obtained from the packed bed reactor after hydroprocessing of mixed plastic pyrolysis oil had a total chloride content of 2.94 ppmw. Since this can be regarded as a border-line value for steam cracker feed, a polishing step was performed by mixing 5 g of this product with 1 g of γ-alumina at room temperature for 1 h to monitor its adsorptive performance. The supernatant from this polishing step was analyzed and found to have 1.46 ppmw chloride, which indicated a reduction of approximately 50%. Further, any carry over of the volatile organochloride compounds (VOCC) from a scavenging tank vapor phase could be routed through a scavenger bed/column downstream of a caustic scrubber.

Example 4

The pyrolysis of a mixed plastic feed was investigated. More specifically, the viscosity of the pyrolysis product was investigated as a function of cracking temperature along with in-situ scavenging of chlorides by heating PVC-containing plastic feed mixtures in presence of metal and non-metal loaded catalysts.

Feed Preparation.

A series of thermo-catalytic cracking experiments were performed in a round bottom flask (RBF) using waste plastic model feed mixtures. The composition of the feed mixtures used in this study is shown in data Table 1 displayed in FIG. 5A. PET was used in the feed mixture for all RBF runs from 1 to 7, except for run 5. To about 100 g of the plastic feed mixture containing HDPE, LDPE, LLDPE, PVC, PS, PP, and PET, 5 g of ZSM-5 zeolite catalyst #1 (CAT-1) with or without metal loading was added and placed in an RBF. The above mixture of feed and catalyst was thoroughly mixed in the RBF with a stainless steel (SS) spatula prior to the run to ensure thorough mixing of feed and catalyst, to ensure proper feed cracking. ZSM-5 CAT-1 was characterized by a Si/Al ratio of 3.4, as measured by solid state nuclear magnetic resonance (NMR) spectroscopy performed on a 400 MHz Bruker instrument at room temperature using 4 mm a magic angle spinning (MAS) probe with a spinning speed of 10 KHz using 4.2 μs pulse and 5 s delay.

Feed Heating.

The feed mixture was subjected to heating using an external mantle heater with a PID temperature controller along with the assistance of magnetic stirring. Further, the plastic feed mixture was heated to a maximum cracking temperature of 360° C. with a reaction hold time of 20 min, after reaching the targeted temperature conditions. Temperature overshooting in the RBF was avoided by using an incremental step heating. An incremental step of 50° C. was used during heating from initial temperature (ambient) to 300° C., and then an incremental step of 10° C. was used up to a maximum feed cracking temperature of 360° C.

Catalyst Loading.

Catalyst ZSM-5 CAT-1 was used as a baseline catalyst (e.g., base catalyst) for RBF run #1. However, Mg loaded ZSM-5 CAT-1 was used exclusively or in a combination with the base catalyst for all other runs as shown in data Table 2 displayed in FIG. 5B. Catalyst loading and cracking temperature conditions used during the RBF runs are as shown in Table 2 displayed in FIG. 5B. For RBF runs #1 and #2, an additional hold time of 20 min was kept at 300° C., 320° C. and 340° C., prior to reaching the cracking temperature of 360° C., to mimic the axial temperature conditions prevailing in a devolatilization extrusion process.

Off-Gas Treatment.

A glass bubbler apparatus was used to maintain a constant purge of nitrogen during the RBF runs to ensure an oxygen free reaction environment and stripping of chlorides liberated from the feed mixture. The gas mixture containing nitrogen and light volatile hydrocarbons was passed through a glass condenser with a water cooling temperature of 10° C. Further, a caustic bath containing freshly prepared NaOH solution (20% w/w) was used to trap the chlorides formed during the thermo-catalytic cracking. Around 300° C. RBF temperature, a visual color change was observed as the chlorides got trapped in the caustic bath (by bubbling of gases from the RBF), from transparent to yellowish green.

Mass Balance Closure.

No visible condensation was observed (as a separate hydrocarbon layer above caustic solution in the bubbler) due to the carryover of volatile hydrocarbons from RBF to the condenser to the caustic apparatus. Mass balance closure for all the RBF runs ranged from 89.23 wt. % to 97.32 wt. %, as shown in Table 2 displayed in FIG. 5B. The losses were primarily accounted as hydrocarbon gases or volatiles escaping from RBF during leaks ranging from 2.68 wt. % to 10.77 wt. %.

Sample Collection and Analysis.

After the cracking reaction was complete, the hot melt from RBF was poured onto a quartz Petri dish, while decanting the top melt layer from the bottom layer containing mostly catalyst particles with wax and coke deposits. After ambient cooling, the top layer became a solid cake which was reheated for viscosity and chloride analysis. Decanting operation of the melt was performed carefully in the hood to prevent the flashing of organic vapors and bubble formation.

Plastic Melt Viscosity.

The plastic melt viscosity was measured as a function of cell temperature from 200° C. to 350° C. using a Brookfield RV DV II viscometer with a spindle 05. The samples were conditioned at 200° C. for 20 mins in 100 mL beaker before start of measurements. A measuring spindle (spindle No. 05) was inserted in the sample and was heated to the respective temperature (200° C.). Pre-shearing was performed for 2 min to homogenize the samples after reaching steady state temperature of 200° C. in the viscosity measurement cell. Measurements were performed on the homogenized samples. Then, the viscosity data was recorded continuously within the measurable torque limits up to a maximum cell temperature of 350° C. The temperature was ramped from 200° C. to 350° C. and viscosity was recorded at each measurement temperature.

Chloride Analysis.

Total chloride analysis was performed for the cracked plastic melt (solid cake obtained from top layer as described above), catalyst particles and the liquid fractions obtained from solvent wash of catalyst particles. The bottom layer of catalyst particles was heated using ethyl benzene (EB) at 110° C., and the catalyst particles were recovered for secondary washing with acetone wash. After recovering the solid catalyst from filtration followed by drying the spent solvent, wash mixtures of ethyl benzene and acetone were analyzed for total chloride content independently.

Melt Viscosity Results.

Figure 6A:
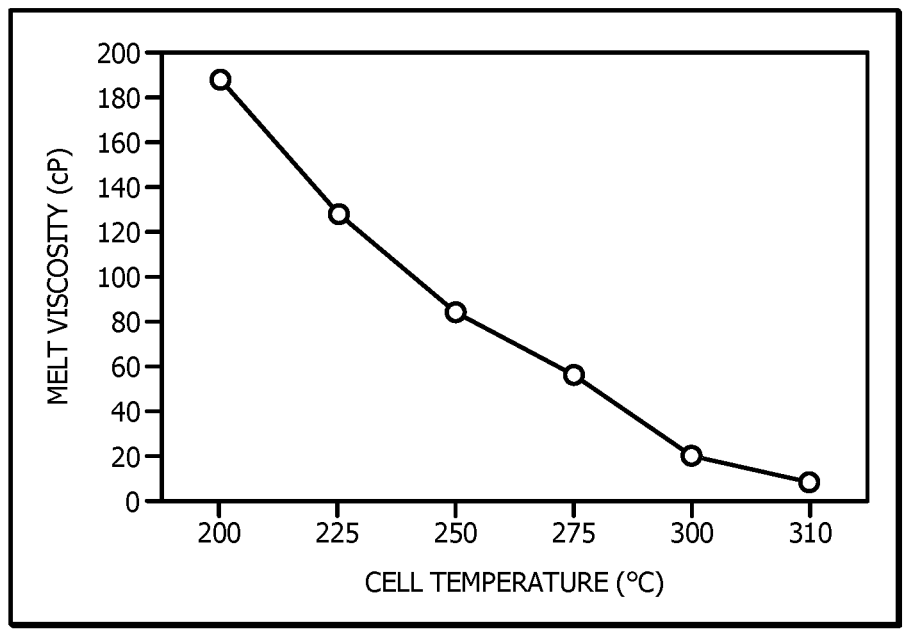
FIGS. 6A, 6B, 6C, 6D, 6E, 6F and 6G display melt viscosity data for Example 4.
Figure 6B:
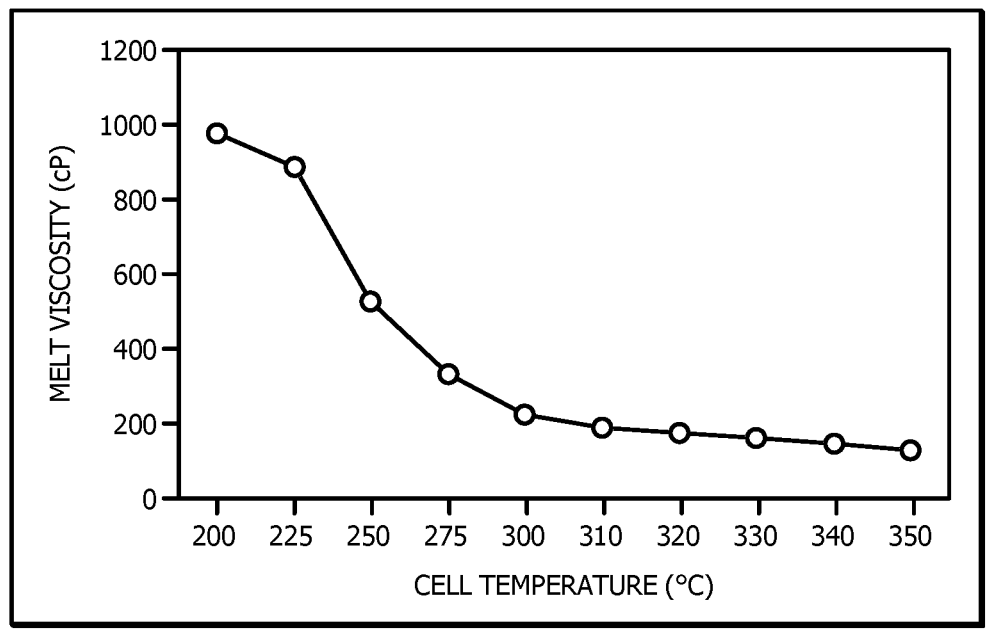
Figure 6C:
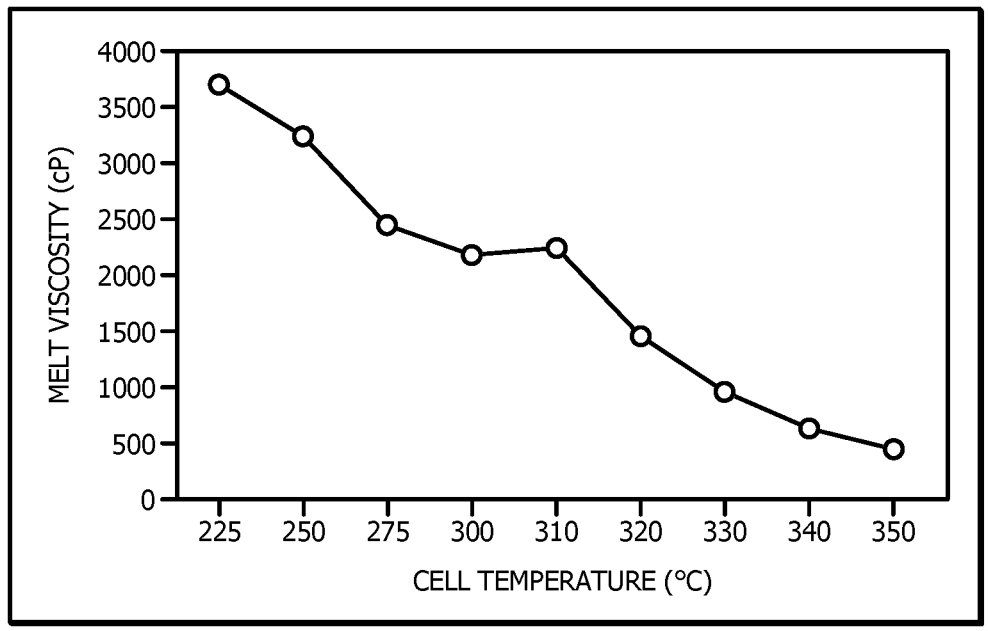
Figure 6D:
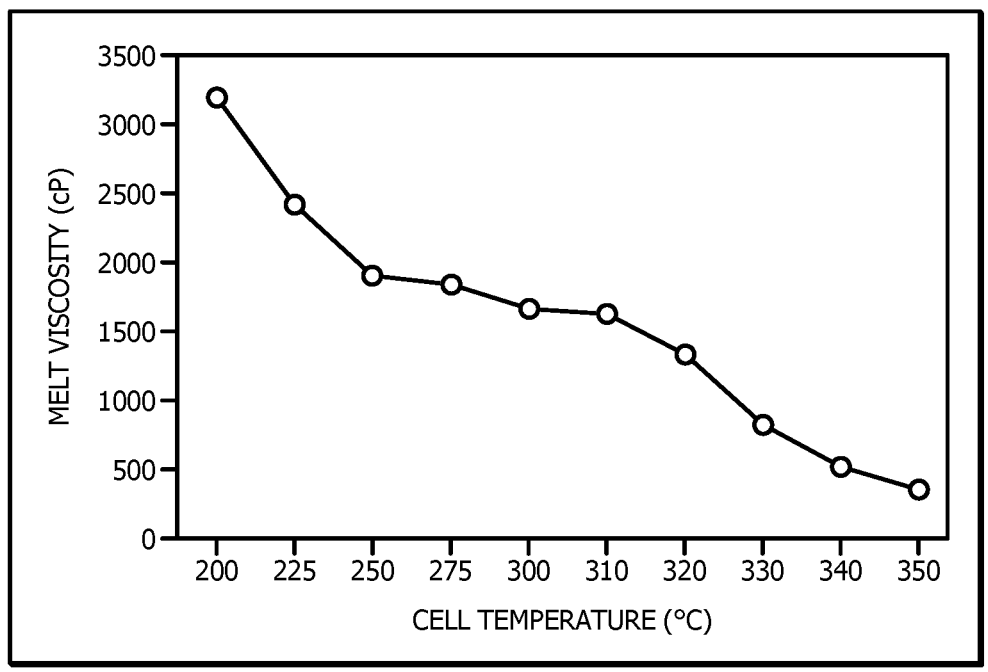
Figure 6E:
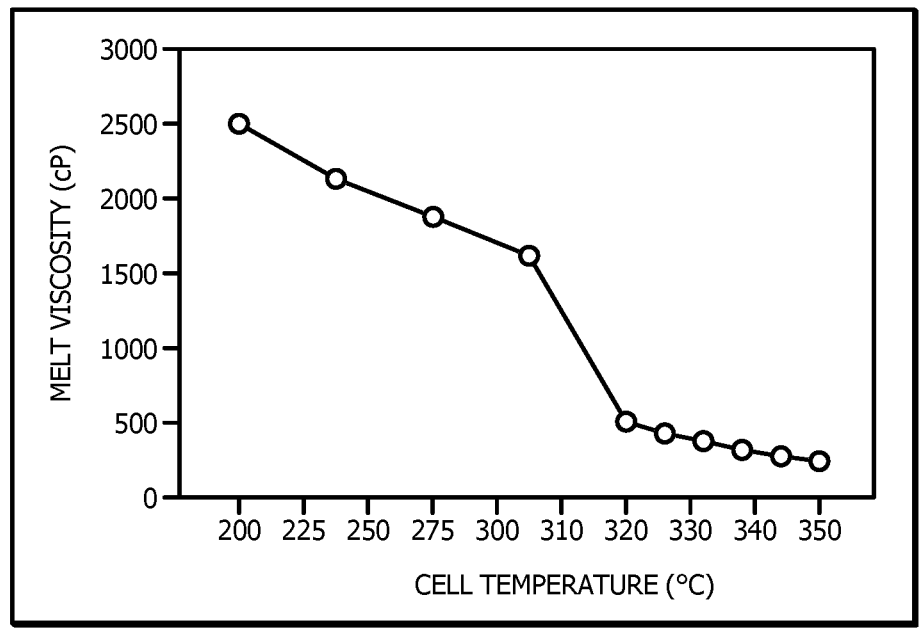
Figure 6F:
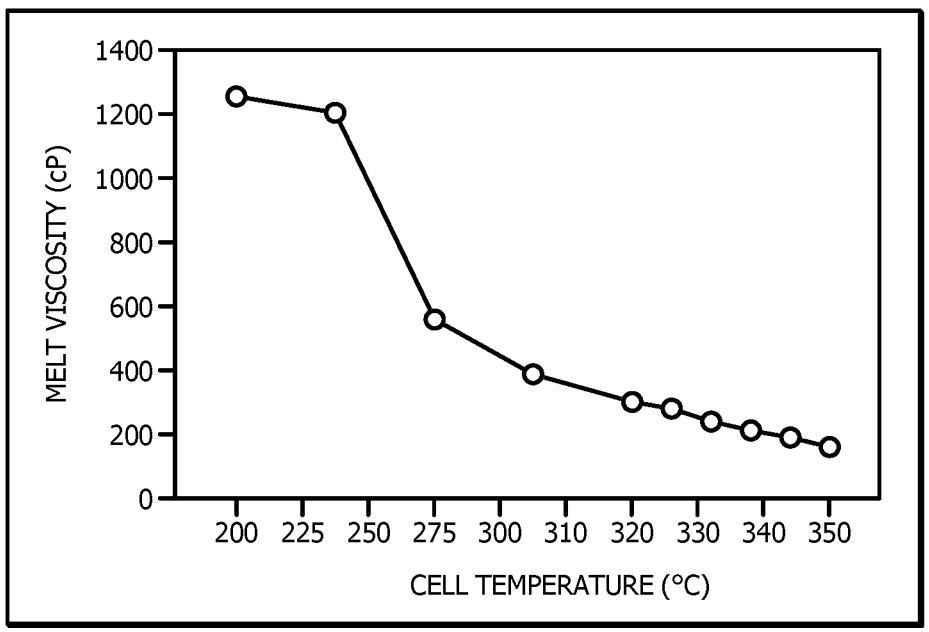
Figure 6G:
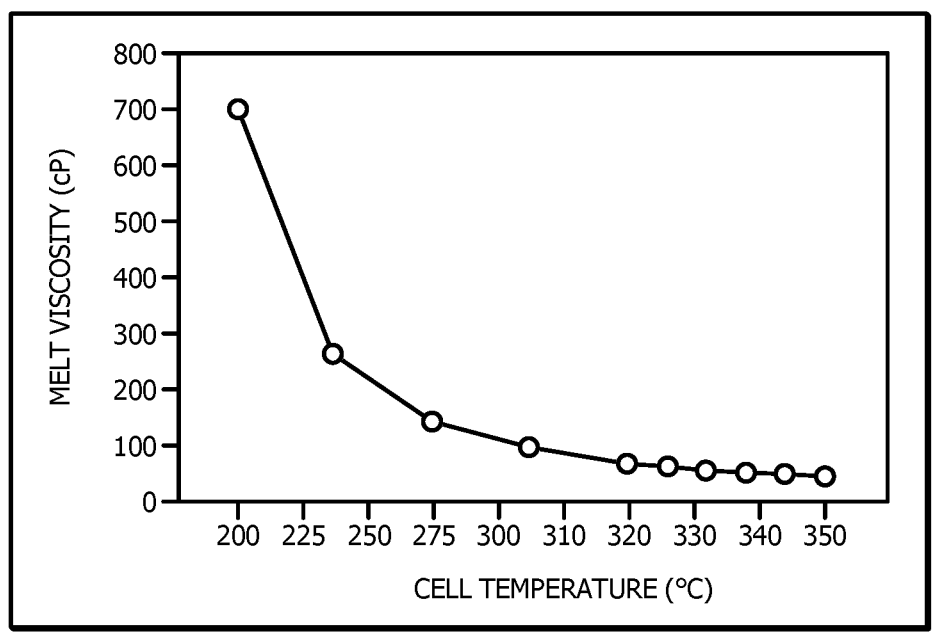

The melt viscosity data for RBF runs 1 to 7 is shown in FIGS. 6A, 6B, 6C, 6D, 6E, 6F and 6G. FIGS. 6A, 6B, 6C, 6D, 6E, 6F and 6G display melt viscosities as a function of cell temperature for RBF runs 1, 2, 3, 4, 5, 6, and 7, respectively. The minimum viscosity was observed to be 8 cP for RBF run 1 at a corresponding measurement cell temperature of 310° C. The maximum viscosity was observed to be 3700 cP for RBF run 3 at a corresponding measurement cell temperature of 225° C. As shown in FIG. 6A, the viscosity profile for RBF run 1 indicated a sharp decrease from 188 cP to 8 cP (change of 95.74%) as the cell temperature was increased from 200° C. to 310° C. This trend reveals that the base catalyst without metal loading has highest cracking activity compared to the other three runs where the catalyst was loaded with Mg. Without wishing to be limited by theory, with the addition of Mg, the acidity of ZSM-5 CAT-1 potentially decreased and hence a decreased cracking activity was observed. A viscosity profile for RBF run 2 is displayed in FIG. 6B (the run conditions for RBF run 2 are the same as for RBF run 1 with respect to temperature, but RBF run 2 used Mg loaded ZSM-5 CAT-1 instead of the baseline catalyst which was used in RBF run 1) indicates that the viscosity dropped from 972 cP at 200° C. to 188 cP at 310° C. This shows that the degree of cracking in RBF run #2 was lower compared to that in RBF run #1. Also a comparison of FIGS. 6B, 6C, 6D and 6E shows that with increased cracking temperature, the viscosity of the product is reduced. Due to higher cracking temperature of 360° C., the initial viscosity measured at 200° C. for melt from RBF run 2 was lower by at least a factor of 3.45 as compared to the melts from RBF runs 3 and 4. The coke and wax formation was observed to be more severe in RBF runs 2 to 4. Also, as can be seen from Table 2 displayed in FIG. 5B, when the RBF temperature was lower, the loss of product as gas (volatiles %) was reduced giving better yields of melt/liquid product. However, the chloride scavenging of Mg loaded catalyst was much higher as confirmed by the total chloride analysis data in data Table 3 displayed in FIG. 5C for RBF run #5. In the case of RBF run #3 and RBF run #4, gas purge during the experiment was frequently interrupted due to leaks from glass joints, as a result of which the chloride content in these cases showed higher levels than expected. Hence, the metal loaded ZSM-5 CAT-1 resulted in good dechlorination and good liquid yield as compared to base catalyst. The base catalyst results in good dechlorination, but due to higher conversion gave an inferior liquid product yield due to loss of volatiles.

Hence, processing units employing a metal loaded catalyst in a devolatilization extruder would maximize the liquid feed with reduced chloride content going to downstream cracking units. An overall product yield could thus be enhanced from a selective cracking in the downstream cracking units. Also, because of the reduced liquid feed chloride content, the downstream cracking units could employ more severe cracking conditions for enhanced yield of high value chemicals, such as light gas olefins and aromatics. Further, since the chloride content of feed to downstream units would be much reduced, the downstream units could employ more conventional and less expensive material of construction and could have a longer lifetime due to reduced possibility of corrosion.

As it can be seen from RBF run 6 and RBF run 7, it is also possible to use a mixture of ZSM-5 CAT-1 and Mg/metal loaded ZSM-5 CAT-1 to achieve cracking, viscosity reduction and chloride scavenging. Experiment RBF run #6 indicates that it is possible to reduce chlorides in the product to less than 1 ppm level even when a 4:1 weight ratio mixture of ZSM-5 CAT-1 and 10% Mg-ZSM-5 CAT-1 is employed. A comparison of the data in FIG. 6F (RBF run 6) and FIG. 6B (RBF run 2) indicates that a 4:1 mass ratio of ZSM-5 CAT-1 to 10% Mg-loaded ZSM-5 CAT-1 gives a greater overall reduction in iscosity as a result of more cracking as compared to the use of only Mg-loaded ZSM-5 CAT-1. Experiment RBF run #7 was conducted to study the effect of additional residence time provided in a cracking environment to a liquid product from RBF run #4. This case mimics the case of a devolatilization extruder product containing wax going to a downstream catalytic or thermal cracker along with the catalyst from the extruder. As can be seen from the chloride results for this case, significant drop in chlorides from greater than 100 ppm in RBF run #4 to about 4 ppm in RBF run #7 occurs. A comparison of the data in FIG. 6D (RBF run 4) and FIG. 6G (RBF run 7) indicates a significant drop in viscosity because of additional hold time and additional cracking. Hence, cracking units downstream of the devolatilization extruders could provide additional residence time, which could lead to significant dechlorination and provide a product with desired characteristics. Cracking units downstream of the devolatilization extruders do not necessarily require fresh catalyst (although fresh catalyst could be employed in such units), and could provide for cracking by using only the catalyst (e.g., residual catalyst) present in an extruder effluent stream (e.g., devolatilization extruder effluent).

The present disclosure is further illustrated by the following embodiments, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

The following are enumerated aspects which are provided as non-limiting examples.

A first aspect, which is a process for dechlorination of a hydrocarbon stream and/or a hydrocarbon stream precursor comprising introducing the hydrocarbon stream and/or hydrocarbon stream precursor, a first zeolitic catalyst, and a stripping gas to a devolatilization extruder (DE) to produce an extruder effluent, wherein the hydrocarbon stream and/or hydrocarbon stream precursor comprises one or more chloride compounds in an amount of equal to or greater than about 10 ppm chloride, based on the total weight of the hydrocarbon stream and/or hydrocarbon stream precursor, and wherein the extruder effluent comprises one or more chloride compounds in an amount of less than the chloride amount in the hydrocarbon stream and/or hydrocarbon stream precursor.

A second aspect, which is the process of the first aspect, wherein the extruder effluent is an extruder melt effluent or an extruder liquid effluent.

A third aspect, which is the process of any one of the first and the second aspects, wherein the first zeolitic catalyst comprises a fluid catalytic cracking catalyst, a molecular sieve, a zeolite, a hydrophobic zeolite, a ZSM-5 zeolite, a metal loaded zeolite, or combinations thereof.

A fourth aspect, which is the process of any one of the first through the third aspects, wherein the first zeolitic catalyst is characterized by an average particle size of less than 100 microns.

A fifth aspect, which is the process of any one of the first through the fourth aspects, wherein the first zeolitic catalyst is characterized by an average particle size of less than 10 microns.

A sixth aspect, which is the process of any one of the first through the fifth aspects, wherein the first zeolitic catalyst is present in an amount of less than about 5 wt. %, based on the total weight of the hydrocarbon stream and/or hydrocarbon stream precursor.

A seventh aspect, which is the process of any one of the first through the sixth aspects, wherein the stripping gas comprises nitrogen, hydrogen, argon, helium, $C_1$-$C_4$ gas hydrocarbons, alkanes, methane, ethane, propane, butane, isobutane, or combinations thereof.

An eighth aspect, which is the process of any one of the first through the seventh aspects, wherein the DE is characterized by a temperature of from about 150° C. to about 450° C.

A ninth aspect, which is the process of any one of the first through the eighth aspects, wherein the DE is characterized by a pressure of from about 1 atm absolute (atma) to about $10^{-14}$ Torr.

A tenth aspect, which is the process of any one of the first through the ninth aspects, wherein the DE is characterized by a residence time of from about 0.1 minutes to about 1 hour or more.

An eleventh aspect, which is the process of any one of the first through the tenth aspects, wherein a portion of the extruder effluent is recycled to the DE.

A twelfth aspect, which is the process of any one of the first through the eleventh aspects further comprising recycling to the DE an amount of extruder effluent effective to provide for a boiling end point of the extruder effluent of less than about 370° C.

A thirteenth aspect, which is the process of any one of the first through the twelfth aspects further comprising dechlorinating at least a portion of the extruder effluent in a scavenging vessel to yield a polished hydrocarbon stream, wherein the polished hydrocarbon stream comprises one or more chloride compounds in an amount of less than about 3 ppm chloride, based on the total weight of the polished hydrocarbon stream.

A fourteenth aspect, which is the process of the thirteenth aspect, wherein dechlorinating comprises removing at least a portion of one or more chloride compounds via adsorptive dechlorination to yield the polished hydrocarbon stream.

A fifteenth aspect, which is the process of any one of the first through the fourteenth aspects, wherein the polished hydrocarbon stream comprises one or more chloride compounds in an amount of less than about 1 ppm chloride, based on the total weight of the polished hydrocarbon stream.

A sixteenth aspect, which is the process of any one of the first through the fifteenth aspects, wherein dechlorinating comprises contacting at least a portion of the extruder effluent with a chloride adsorber, wherein the extruder effluent comprises at least a portion of the first zeolitic catalyst, and wherein the chloride adsorber and/or the first zeolitic catalyst provide for removing of at least a portion of one or more chloride compounds of the extruder effluent.

A seventeenth aspect, which is the process of the sixteenth aspect, wherein the chloride adsorber comprises attapulgite, activated carbon, dolomite, bentonite, iron oxide, goethite, hematite, magnetite, alumina, gamma alumina, silica, aluminosilicates, ion exchange resins, hydrotalcites, spinels, copper oxides, zinc oxide, sodium oxide, calcium oxide, magnesium oxide, metal loaded zeolites, molecular sieve 13X, or combinations thereof.

An eighteenth aspect, which is the process of any one of the first through the seventeenth aspects further comprising feeding at least a portion of the polished hydrocarbon stream to a steam cracker to yield a high value product, wherein the polished hydrocarbon stream has a boiling end point of less than about 370° C., and wherein the high value product comprises ethylene, propylene, butene, butadiene, aromatic compounds, or combinations thereof.

A nineteenth aspect, which is the process of any one of the first through the eighteenth aspects, wherein dechlorinating occurs (i) at a temperature of from about 25° C. to about 225° C.; and/or (ii) under agitating, stirring, magnetic stirring, passing through a fixed or fluidized adsorption bed of adsorbents, or combinations thereof A twentieth aspect, which is the process of any one of the first through the nineteenth aspects further comprising (i) recovering a chlorine-containing gaseous stream from the scavenging vessel; (ii) removing at least a portion of the chloride from at least a portion of the chlorine-containing gaseous stream to produce a treated gaseous stream; and (iii) recycling at least a portion of the treated gaseous stream as stripping gas to the DE.

A twenty-first aspect, which is the process of any one of the first through the twentieth aspects, wherein further comprising (i) introducing at least a portion of the extruder effluent to a catalytic cracker to produce a hydrocarbon product stream, wherein a viscosity of the hydrocarbon product stream is lower than a viscosity of the extruder effluent; and (ii) dechlorinating at least a portion of the hydrocarbon product stream to yield a polished hydrocarbon stream, wherein the polished hydrocarbon stream comprises one or more chloride compounds in an amount of less than about 3 ppm chloride, based on the total weight of the polished hydrocarbon stream.

A twenty-second aspect, which is the process of the twenty-first aspect, wherein the extruder effluent comprises at least a portion of the first zeolitic catalyst, wherein the catalytic cracker comprises a second zeolitic catalyst; wherein the first zeolitic catalyst and the second zeolitic catalyst are the same or different; and wherein both the first zeolitic catalyst and the second zeolitic catalyst provide for catalytic cracking of the extruder effluent to produce the hydrocarbon product stream.

A twenty-third aspect, which is the process of any one of the first through the twenty-second aspects, wherein the first zeolitic catalyst is a mixture of two or more different zeolitic catalysts, wherein each zeolitic catalyst can be independently selected from the group consisting of a fluid catalytic cracking catalyst, a molecular sieve, a zeolite, a hydrophobic zeolite, a ZSM-5 zeolite, and a metal loaded zeolite.

A twenty-fourth aspect, which is the process of any one of the first through the twenty-third aspects, wherein the second zeolitic catalyst comprises integrated catalyst particles obtained by embedding two or more different zeolitic catalysts in a matrix, wherein each zeolitic catalyst can be independently selected from the group consisting of a fluid catalytic cracking catalyst, a molecular sieve, a zeolite, a hydrophobic zeolite, a ZSM-5 zeolite, and a metal loaded zeolite.

A twenty-fifth aspect, which is the process of any one of the first through the twenty-fourth aspects, wherein the second zeolitic catalyst is selected from the group consisting of a fluid catalytic cracking catalyst, a molecular sieve, a zeolite, a hydrophobic zeolite, a ZSM-5 zeolite and a metal loaded zeolite.

A twenty-sixth aspect, which is the process of any one of the first through the twenty-fifth aspects, wherein the second zeolitic catalyst is a physical mixture of two or more zeolitic catalysts, wherein each zeolitic catalyst can be independently selected from the group consisting of a fluid catalytic cracking catalyst, a molecular sieve, a zeolite, a hydrophobic zeolite, a ZSM-5 zeolite and a metal loaded zeolite.

A twenty-seventh aspect, which is the process of any one of the first through the twenty-sixth aspects, wherein the catalytic cracker is characterized by a temperature of from about 350° C. to about 730° C.

A twenty-eighth aspect, which is the process of any one of the first through the twenty-seventh aspects further comprising (i) introducing at least a portion of the extruder effluent to a thermal cracking reactor to produce a hydrocarbon product stream, wherein a viscosity of the hydrocarbon product stream is lower than a viscosity of the extruder effluent; and (ii) dechlorinating at least a portion of the hydrocarbon product stream to yield a polished hydrocarbon stream, wherein the polished hydrocarbon stream comprises one or more chloride compounds in an amount of less than about 3 ppm chloride, based on the total weight of the polished hydrocarbon stream.

A twenty-ninth aspect, which is the process of any one of the first through twenty-eighth aspects further comprising (i) recovering a spent stripping gas from the DE, wherein the spent stripping gas comprises at least a portion of the stripping gas, and one or more chloride compounds, wherein one or more chloride compounds comprise at least a portion of the chloride of the hydrocarbon stream and/or hydrocarbon stream precursor; (ii) contacting at least a portion of the spent stripping gas with a caustic solution to remove a first portion of the chloride from the spent stripping gas and to produce a treated spent stripping gas; (iii) contacting at least a portion of the treated spent stripping gas with a chloride adsorber to remove a second portion of the chloride from the treated spent stripping gas to produce a treated gaseous stream; and (iv) recycling at least a portion of the treated gaseous stream as stripping gas to the DE.

A thirtieth aspect, which is the process of any one of the first through the twenty-ninth aspects, wherein the hydrocarbon stream precursor comprises a mixed plastic waste.

A thirty-first aspect, which is the process of the thirtieth aspect, wherein the mixed plastic waste comprises polyvinylchloride (PVC), polyvinylidene chloride (PVDC), polyethylene terephthalate, polybutylene terephthalate, polyolefins, polystyrenes, or combinations thereof.

A thirty-second aspect, which is the process of any one of the first through the thirty-first aspects, wherein the mixed plastic waste comprises chloride in an amount of equal to or greater than about 200 ppm, based on the total weight of the mixed plastic waste.

A thirty-third aspect, which is the process of any one of the first through the thirty-second aspects, wherein the mixed plastic waste comprises PVC and/or PVDC in an amount of equal to or greater than about 400 ppmw, based on the total weight of the mixed plastic waste.

A thirty-fourth aspect, which is the process of any one of the first through the thirty-third aspects further comprising introducing at least a portion of the hydrocarbon stream precursor to a thermal cracking reactor to produce the hydrocarbon stream, wherein the thermal cracking reactor is characterized by a temperature of from about 300° C. to about 400° C.

A thirty-fifth aspect, which is the process of any one of the first through the thirty-fourth aspects, wherein a viscosity of the extruder effluent is lower than a viscosity of the hydrocarbon stream.

A thirty-sixth aspect, which is a process for processing mixed plastic waste comprising (a) introducing a mixed plastic waste to a thermal cracking reactor to produce a hydrocarbon stream in a liquid phase and a gaseous stream, wherein the thermal cracking reactor is characterized by a temperature of from about 300° C. to about 400° C., and wherein the hydrocarbon stream comprises one or more chloride compounds in an amount of equal to or greater than about 10 ppm chloride, based on the total weight of the hydrocarbon stream; (b) introducing at least a portion of the hydrocarbon stream, a zeolitic catalyst, and a stripping gas to a devolatilization extruder (DE) to produce an extruder effluent and a spent stripping gas, wherein the DE is characterized by a temperature of from about 150° C. to about 450° C., wherein the DE is characterized by a pressure of from about 1 atm absolute to about $10^{-14}$ Torr, wherein the DE is characterized by a residence time of from about 0.1 minutes to about 1 hour or more, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds of the hydrocarbon stream; (c) introducing at least a portion of the extruder effluent to a catalytic cracker to produce a hydrocarbon product stream in a liquid phase and a gaseous product stream, wherein a viscosity of the hydrocarbon product stream is lower than a viscosity of the extruder effluent, and wherein the catalytic cracker is characterized by a temperature of from about 350° C. to about 730° C.; (d) dechlorinating at least a portion of the hydrocarbon product stream to yield a polished hydrocarbon stream and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream comprises one or more chloride compounds in an amount of less than about 3 ppm chloride, based on the total weight of the polished hydrocarbon stream; (e) feeding at least a portion of the polished hydrocarbon stream to a steam cracker to yield a high value product, wherein the high value product comprises ethylene, propylene, butene, butadiene, aromatic compounds, or combinations thereof; (f) contacting at least a portion of the spent stripping gas from the DE, at least a portion of the gaseous stream from the thermal cracking reactor, at least a portion of the gaseous product stream from the catalytic cracker, or combinations thereof with a caustic solution to remove a portion of one or more chloride compounds from the spent stripping gas, the gaseous stream, the gaseous product stream, or combinations thereof and to produce a treated spent stripping gas; (g) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream; (h) separating olefin gases as a high value product from the treated gaseous stream to provide a separated treated gas stream; and (i) recycling at least a portion of the treated gaseous stream and/or at least a portion of the separated treated gas stream as stripping gas to the DE.

A thirty-seventh aspect, which is the process of the thirty-sixth aspect, wherein the mixed plastic waste comprises equal to or greater than about 400 ppmw polyvinylchloride and/or polyvinylidene chloride; and equal to or greater than about 400 ppmw polyethylene terephthalate.

A thirty-eighth aspect, which is a process for processing mixed plastic waste comprising (a) introducing a mixed plastic waste to a thermal cracking reactor to produce a hydrocarbon stream in a liquid phase and a gaseous stream, wherein the thermal cracking reactor is characterized by a temperature of from about 350° C. to about 730° C., and wherein the hydrocarbon stream comprises one or more chloride compounds in an amount of equal to or greater than about 10 ppm chloride, based on the total weight of the hydrocarbon stream; (b) introducing at least a portion of the hydrocarbon stream, a zeolitic catalyst, and a stripping gas to a devolatilization extruder (DE) to produce an extruder effluent and a spent stripping gas, wherein the DE is characterized by a temperature of from about 150° C. to about 450° C., wherein the DE is characterized by a pressure of from about 1 atm absolute to about $10^{-14}$ Torr, wherein the DE is characterized by a residence time of from about 0.1 minutes to about 1 hour or more, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds of the hydrocarbon stream; (c) dechlorinating at least a portion of the extruder effluent to yield a polished hydrocarbon stream and a chlorine-containing gaseous stream, wherein dechlorinating occurs at a temperature of from about 25° C. to about 225° C. and under agitating, stirring, magnetic stirring, passing through a fixed or fluidized adsorption bed of adsorbents, or combinations thereof; and wherein the polished hydrocarbon stream comprises one or more chloride compounds in an amount of less than about 3 ppm chloride, based on the total weight of the polished hydrocarbon stream; (d) feeding at least a portion of the polished hydrocarbon stream to a steam cracker to yield a high value product, wherein the high value product comprises ethylene, propylene, butene, butadiene, aromatic compounds, or combinations thereof; (e) contacting at least a portion of the spent stripping gas from the DE and/or at least a portion of the gaseous stream from the thermal cracking reactor with a caustic solution to remove a portion of one or more chloride compounds from the spent stripping gas gaseous stream and to produce a treated spent stripping gas; (f) contacting at least a portion of the treated spent stripping gas and/or at least a portion of the chlorine-containing gaseous stream with a chloride adsorber to remove at least a portion of the chloride from the treated spent stripping gas and/or at least a portion of chloride from the chlorine-containing gaseous stream and to produce a treated gaseous stream; (g) separating olefin gases as a high value product from the treated gaseous stream to provide a separated treated gas stream; and (h) recycling at least a portion of the treated gaseous stream and/or at least a portion of the separated treated gas stream as stripping gas to the DE.

A thirty-ninth aspect, which is the process of the thirty-eighth aspect, wherein the mixed plastic waste comprises equal to or greater than about 400 ppmw polyvinylchloride and/or polyvinylidene chloride.

While aspects of the disclosure have been shown and described, modifications thereof can be made without departing from the spirit and teachings of the invention. The aspects and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention. The disclosures of all patents, patent applications, and publications cited herein are hereby incorporated by reference.

What is claimed is:

1. A process for processing mixed plastic waste consisting of the steps of:
    (a) introducing a mixed plastic waste to a thermal cracking reactor to produce a hydrocarbon stream in a liquid phase and a gaseous stream, wherein the thermal cracking reactor is characterized by a temperature of from about 300° C. to about 400° C., and wherein the hydrocarbon stream comprises one or more chloride compounds in an amount of equal to or greater than about 10 ppm chloride, based on a total weight of the hydrocarbon stream, wherein the mixed plastic waste comprises polyvinylidene chloride (PVDC) and at least one member selected from the group consisting of polyethylene terephthalate, polybutylene terephthalate, a polyolefin, a polystyrene, and combinations thereof;
    (b) introducing at least a portion of the hydrocarbon stream, a zeolitic catalyst, and a stripping gas to a devolatilization extruder (DE) to produce an extruder effluent and a spent stripping gas, wherein the DE is characterized by a temperature of 175° C., a pressure of about 1 atm, and a residence time of about 1 minute, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds;
    (c) introducing at least a portion of the extruder effluent to a catalytic cracker to produce a hydrocarbon product stream in a liquid phase and a gaseous product stream, wherein a viscosity of the hydrocarbon product stream is lower than a viscosity of the extruder effluent, and wherein the catalytic cracker is characterized by a temperature of from about 350° C. to about 730° C.;
    (d) dechlorinating at least a portion of the hydrocarbon product stream to yield a polished hydrocarbon stream and a chlorine-containing gaseous stream, wherein dechlorinating occurs at a temperature of from about 25° C. to about 225° C. and comprises agitating, stirring, magnetic stirring, passing through a fixed or fluidized adsorption bed of adsorbents, or combinations thereof; and wherein the polished hydrocarbon stream comprises one or more chloride compounds in an amount of less than about 3 ppm chloride, based on a total weight of the polished hydrocarbon stream;

(e) feeding at least a portion of the polished hydrocarbon stream to a steam cracker to yield a product, wherein the product comprises ethylene, propylene, butene, butadiene, aromatic compounds, or combinations thereof;

(f) contacting at least a portion of the spent stripping gas from the DE, at least a portion of the gaseous stream from the thermal cracking reactor, at least a portion of the gaseous product stream from the catalytic cracker, or combinations thereof with a caustic solution to remove a portion of one or more chloride compounds and to produce a treated spent stripping gas;

(g) contacting at least a portion of the treated spent stripping gas and/or at least a portion of the chlorine-containing gaseous stream with a chloride adsorber to remove at least a portion of the chloride and to produce a treated gaseous stream;

(h) separating olefin gases as a product from the treated gaseous stream to provide a separated treated gas stream; and (i) recycling at least a portion of the separated treated gas stream as stripping gas to the DE.

2. The process of claim 1, wherein the zeolitic catalyst comprises a fluid catalytic cracking catalyst, a molecular sieve, a hydrophobic zeolite, a ZSM-5 zeolite, a metal loaded zeolite, or combinations thereof.

3. The process of claim 1, wherein the zeolitic catalyst is a hydrophobic zeolite.

4. The process of claim 1, wherein the zeolitic catalyst is present in an amount of less than about 5 wt %, based on a total weight of the hydrocarbon stream.

5. The process of claim 1, wherein the stripping gas comprises hydrogen.

6. A process for processing mixed plastic waste consisting of the steps of:

(a) introducing a mixed plastic waste comprising polyvinylidene chloride (PVDC) to a thermal cracking reactor to produce a hydrocarbon stream in a liquid phase and a gaseous stream, wherein the thermal cracking reactor is characterized by a temperature of from about 350° C. to about 730° C., and wherein the hydrocarbon stream comprises one or more chloride compounds in an amount of equal to or greater than about 10 ppm chloride, based on a total weight of the hydrocarbon stream;

(b) introducing at least a portion of the hydrocarbon stream, a zeolitic catalyst, and a stripping gas, wherein the stripping gas consists of hydrogen, to a devolatilization extruder (DE) to produce an extruder effluent and a spent stripping gas, wherein the DE is characterized by a temperature of 200° C., a pressure of about 1 atm absolute, and a residence time of 0.1 minutes, wherein the extruder effluent comprises one or more chloride compounds in an amount of less than the chloride amount in the hydrocarbon stream, wherein a viscosity of the extruder effluent is lower than a viscosity of the hydrocarbon stream, and wherein the spent stripping gas comprises at least a portion of the stripping gas and at least a portion of one or more chloride compounds of the hydrocarbon stream;

(c) dechlorinating at least a portion of the extruder effluent to yield a polished hydrocarbon stream and a chlorine-containing gaseous stream, wherein dechlorinating occurs at a temperature of about 25° C. and comprises agitating, stirring, magnetic stirring, passing through a fixed or fluidized adsorption bed of adsorbents, or combinations thereof; and wherein the polished hydrocarbon stream comprises one or more chloride compounds in an amount of less than 3 ppm chloride, based on a total weight of the polished hydrocarbon stream;

(d) feeding at least a portion of the polished hydrocarbon stream to a steam cracker to yield a product, wherein the product consists of ethylene;

(e) contacting at least a portion of the spent stripping gas from the DE and at least a portion of the gaseous stream from the thermal cracking reactor with a caustic solution to remove a portion of one or more chloride compounds and to produce a treated spent stripping gas;

(f) contacting all of the treated spent stripping gas and/or at least a portion of the chlorine-containing gaseous stream with a chloride adsorber to remove at least a portion of the and to produce a treated gaseous stream; and (g) separating olefin gases as a product from the treated gaseous stream to provide a separated treated gas stream.

7. The process of claim 6, wherein the zeolitic catalyst comprises a fluid catalytic cracking catalyst, a molecular sieve, a hydrophobic zeolite, a ZSM-5 zeolite, a metal loaded zeolite, or combinations thereof.

8. The process of claim 6, wherein the zeolitic catalyst is a hydrophobic zeolite.

9. The process of claim 6, wherein the zeolitic catalyst is present in an amount of less than about 5 wt %, based on a total weight of the hydrocarbon stream.

* * * * *

UNITED STATES PATENT AND TRADEMARK OFFICE
CERTIFICATE OF CORRECTION

PATENT NO. : 10,829,696 B2
APPLICATION NO. : 16/319878
DATED : November 10, 2020
INVENTOR(S) : Mohammad Javeed et al.

It is certified that error appears in the above-identified patent and that said Letters Patent is hereby corrected as shown below:

In the Claims

At Column 32, Claim number 6, Line number 38, delete "portion of the and" and replace with --portion of the chloride and--.

Signed and Sealed this
Fourth Day of January, 2022

Drew Hirshfeld
*Performing the Functions and Duties of the
Under Secretary of Commerce for Intellectual Property and
Director of the United States Patent and Trademark Office*